(12) United States Patent
Watanabe

(10) Patent No.: US 12,433,598 B2
(45) Date of Patent: Oct. 7, 2025

(54) THROMBUS ASPIRATION SYSTEMS AND RELATED METHODS

(71) Applicant: ASAHI INTECC CO., LTD., Seto (JP)

(72) Inventor: Hirobumi Watanabe, Irvine, CA (US)

(73) Assignee: ASAHI INTECC CO., LTD., Seto (JP)

( * ) Notice: Subject to any disclaimer, the term of this patent is extended or adjusted under 35 U.S.C. 154(b) by 207 days.

(21) Appl. No.: 17/498,526

(22) Filed: Oct. 11, 2021

(65) Prior Publication Data
US 2022/0110634 A1    Apr. 14, 2022

Related U.S. Application Data

(60) Provisional application No. 63/091,258, filed on Oct. 13, 2020.

(51) Int. Cl.
*A61B 17/12*    (2006.01)
*A61B 17/22*    (2006.01)
(Continued)

(52) U.S. Cl.
CPC .... *A61B 17/1215* (2013.01); *A61B 17/12109* (2013.01); *A61B 90/39* (2016.02);
(Continued)

(58) Field of Classification Search
CPC ......... A61B 17/221; A61B 2017/2215; A61M 25/0097
See application file for complete search history.

(56) References Cited

U.S. PATENT DOCUMENTS

| 4,873,978 A | 10/1989 | Ginsburg |
| 5,011,488 A | 4/1991 | Ginsburg |

(Continued)

FOREIGN PATENT DOCUMENTS

| CN | 110300607 A | 10/2019 |
| JP | 2007-522881 A | 8/2007 |

(Continued)

OTHER PUBLICATIONS

International Search Report and Written Opinion regarding International Application No. PCT/IB2021/059378, mailed Jan. 5, 2022.
(Continued)

*Primary Examiner* — Katherine Shi
*Assistant Examiner* — Mohammed S Adam
(74) *Attorney, Agent, or Firm* — Norton Rose Fulbright US LLP

(57) ABSTRACT

Systems for use in blood clot removal can comprise a first tube, a second tube slidable within the first tube, and a self-expanding receiver having a membrane and positioned at least partially within the second tube. When the second tube and a proximal portion of the receiver are positioned within a distal end portion of the first tube and the second tube is moved proximally relative to the receiver until a distal end of the second tube is positioned proximally of a proximal end of the receiver, the proximal portion of the receiver can radially expand and make contact with the distal end portion of the first tube and a distal portion of the receiver can radially expand such that it has an inner diameter that is at least 10% larger than an inner diameter of the first tube.

20 Claims, 18 Drawing Sheets

(51) Int. Cl.
  *A61B 17/221* (2006.01)
  *A61B 90/00* (2016.01)
(52) U.S. Cl.
  CPC .............. *A61B 2017/12054* (2013.01); *A61B 2017/22038* (2013.01); *A61B 2017/22079* (2013.01); *A61B 2017/2215* (2013.01); *A61B 2090/3966* (2016.02); *A61B 2217/005* (2013.01)

(56) References Cited

U.S. PATENT DOCUMENTS

| | | | |
|---|---|---|---|
| 5,102,415 | A | 4/1992 | Guenther et al. |
| 5,549,626 | A | 8/1996 | Miller et al. |
| 5,908,435 | A | 6/1999 | Samuels |
| 5,938,645 | A | 8/1999 | Gordon |
| 6,413,235 | B1 | 7/2002 | Parodi |
| 6,602,265 | B2 | 8/2003 | Dubrul et al. |
| 6,632,236 | B2 | 10/2003 | Hogendijk |
| 6,635,070 | B2 | 10/2003 | Leeflang et al. |
| 6,652,548 | B2 | 11/2003 | Evans et al. |
| 6,682,505 | B2 | 1/2004 | Bates et al. |
| 6,902,540 | B2 | 6/2005 | Dorros et al. |
| 7,491,210 | B2 | 2/2009 | Dubrul et al. |
| 7,517,352 | B2 | 4/2009 | Evans et al. |
| 7,591,832 | B2 | 9/2009 | Eversull et al. |
| 7,867,216 | B2 | 1/2011 | Wahr et al. |
| 7,947,012 | B2 | 5/2011 | Spurchise et al. |
| 7,998,163 | B2 | 8/2011 | Salahieh et al. |
| 8,075,510 | B2 | 12/2011 | Aklog et al. |
| 8,100,935 | B2 | 1/2012 | Rosenbluth et al. |
| 8,167,903 | B2 | 5/2012 | Hardert et al. |
| 8,277,470 | B2 | 10/2012 | Demarais et al. |
| 8,343,167 | B2 | 1/2013 | Henson |
| 8,388,628 | B2 | 3/2013 | Eversull et al. |
| 8,468,678 | B2 | 6/2013 | Salahieh et al. |
| 8,469,970 | B2 | 6/2013 | Diamant et al. |
| 8,506,512 | B2 | 8/2013 | Aklog et al. |
| 8,545,526 | B2 | 10/2013 | Martin et al. |
| 8,613,717 | B2 | 12/2013 | Aklog et al. |
| 8,734,374 | B2 | 5/2014 | Aklog et al. |
| 8,858,497 | B2 | 10/2014 | Di Palma et al. |
| 8,900,257 | B2 | 12/2014 | Straub et al. |
| 8,956,383 | B2 | 2/2015 | Aklog et al. |
| 8,979,793 | B2 | 3/2015 | Hofmann |
| 8,992,506 | B2 | 3/2015 | Gulachenski |
| 9,039,715 | B2 | 5/2015 | Diamant et al. |
| 9,149,609 | B2 | 10/2015 | Ansel et al. |
| 9,186,487 | B2 | 11/2015 | Dubrul et al. |
| 9,320,532 | B2 | 4/2016 | Ferrera et al. |
| 9,387,098 | B2 | 7/2016 | Ferrera et al. |
| 9,433,427 | B2 | 9/2016 | Look et al. |
| 9,498,604 | B2 | 11/2016 | Dubrul et al. |
| 9,579,116 | B1 | 2/2017 | Nguyen et al. |
| 9,597,171 | B2 | 3/2017 | Shrivastava et al. |
| 9,750,517 | B2 | 9/2017 | Agrawal |
| 9,844,387 | B2 | 12/2017 | Marchand et al. |
| 9,848,975 | B2 | 12/2017 | Hauser |
| 9,913,936 | B2 | 3/2018 | Look et al. |
| 9,924,958 | B2 | 3/2018 | Martin et al. |
| 9,943,397 | B2 | 4/2018 | Bonnette et al. |
| 9,987,028 | B2 | 6/2018 | Lowinger et al. |
| 10,016,211 | B2 | 7/2018 | Ferrera et al. |
| 10,016,266 | B2 | 7/2018 | Hauser |
| 10,028,759 | B2 | 7/2018 | Wallace et al. |
| 10,092,732 | B2 | 10/2018 | Fulton, III et al. |
| 10,130,387 | B2 | 11/2018 | McRae et al. |
| 10,183,147 | B2 | 1/2019 | Yang et al. |
| 10,231,751 | B2 | 3/2019 | Sos |
| 10,314,684 | B2 | 6/2019 | Walzman |
| 10,383,644 | B2 | 8/2019 | Molaei et al. |
| 10,441,301 | B2 | 10/2019 | Vale et al. |
| 10,456,236 | B2 | 10/2019 | Nguyen et al. |
| 2005/0187570 | A1 | 8/2005 | Nguyen et al. |
| 2006/0041228 | A1 | 2/2006 | Vo et al. |
| 2006/0247662 | A1* | 11/2006 | Schwartz ............ A61B 17/221 606/114 |
| 2006/0247676 | A1 | 11/2006 | Vale et al. |
| 2009/0221967 | A1 | 9/2009 | Thommen et al. |
| 2011/0137399 | A1* | 6/2011 | Chomas ............ A61M 25/0075 623/1.12 |
| 2011/0152920 | A1 | 6/2011 | Eckhouse et al. |
| 2011/0213290 | A1 | 9/2011 | Chin et al. |
| 2011/0213392 | A1 | 9/2011 | Aklog et al. |
| 2011/0238106 | A1 | 9/2011 | Ferrera et al. |
| 2012/0041460 | A1 | 2/2012 | Ferrera et al. |
| 2013/0030461 | A1 | 1/2013 | Marks et al. |
| 2013/0304082 | A1 | 11/2013 | Aklog et al. |
| 2014/0018840 | A1 | 1/2014 | Morgan et al. |
| 2014/0228869 | A1 | 8/2014 | Bonnette et al. |
| 2014/0257245 | A1 | 9/2014 | Rosenbluth et al. |
| 2014/0277015 | A1 | 9/2014 | Stinis et al. |
| 2014/0288583 | A1 | 9/2014 | Stinis et al. |
| 2015/0265299 | A1 | 9/2015 | Cooper et al. |
| 2016/0135829 | A1 | 5/2016 | Holochwost et al. |
| 2016/0220265 | A1 | 8/2016 | Pokorney et al. |
| 2016/0361077 | A1 | 12/2016 | Marks et al. |
| 2017/0105743 | A1 | 4/2017 | Vale et al. |
| 2017/0136158 | A1 | 5/2017 | Culhane et al. |
| 2017/0265885 | A1 | 9/2017 | Bonnette et al. |
| 2017/0303949 | A1 | 10/2017 | Ribo Jacobi et al. |
| 2017/0333060 | A1 | 11/2017 | Panian et al. |
| 2017/0340434 | A1 | 11/2017 | Cerchiari et al. |
| 2017/0367713 | A1 | 12/2017 | Greene et al. |
| 2018/0153555 | A1 | 6/2018 | Herzog |
| 2018/0235743 | A1* | 8/2018 | Farago ............ A61B 17/22 |
| 2018/0256177 | A1 | 9/2018 | Cooper et al. |
| 2018/0256179 | A1 | 9/2018 | Hayakawa |
| 2018/0338770 | A1 | 11/2018 | Mogi et al. |
| 2019/0117244 | A1 | 4/2019 | Wallace et al. |
| 2019/0167287 | A1 | 6/2019 | Vale et al. |
| 2019/0262120 | A1 | 8/2019 | Walzman |
| 2019/0269491 | A1 | 9/2019 | Jalgaonkar et al. |
| 2019/0274810 | A1 | 9/2019 | Phouasalit et al. |
| 2019/0307985 | A1 | 10/2019 | Panian et al. |
| 2019/0321525 | A1 | 10/2019 | Aklog et al. |
| 2019/0328410 | A1 | 10/2019 | Look et al. |
| 2019/0328411 | A1 | 10/2019 | Vale et al. |
| 2020/0029984 | A1 | 1/2020 | Wang et al. |
| 2020/0069912 | A1 | 3/2020 | Tateshima et al. |
| 2020/0113588 | A1 | 4/2020 | Shrivastava et al. |
| 2020/0121333 | A1 | 4/2020 | Aklog et al. |
| 2020/0121335 | A1 | 4/2020 | Aboytes |
| 2020/0129192 | A1 | 4/2020 | Lin |
| 2020/0345904 | A1* | 11/2020 | Casey ............ A61M 25/0097 |

FOREIGN PATENT DOCUMENTS

| | | |
|---|---|---|
| WO | WO 2004/093966 | 11/2004 |
| WO | WO 2005/079678 A1 | 9/2005 |
| WO | WO 2010/023671 | 8/2009 |
| WO | WO 2012/156924 | 11/2012 |
| WO | WO 2014/081077 | 5/2014 |
| WO | WO 2017/192999 | 5/2017 |
| WO | WO 2018/118706 | 8/2017 |
| WO | WO 2018/033401 | 2/2018 |
| WO | WO 2018/053574 A1 | 3/2018 |
| WO | WO 2019/052605 | 9/2018 |
| WO | WO 2019/146283 | 8/2019 |
| WO | WO 2019/147985 A1 | 8/2019 |

OTHER PUBLICATIONS

Sanchez et al., "ANCD thrombectomy device: in vitro evaluation," *J NeuroIntervent Surg* 12:77-81, 2020.

\* cited by examiner

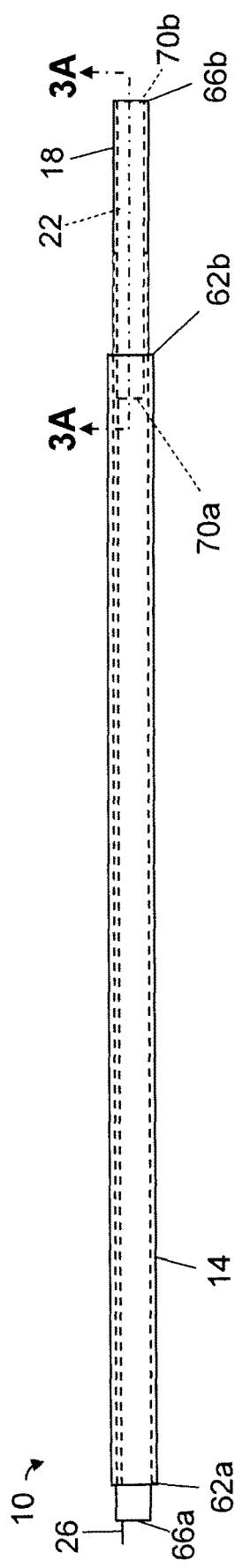
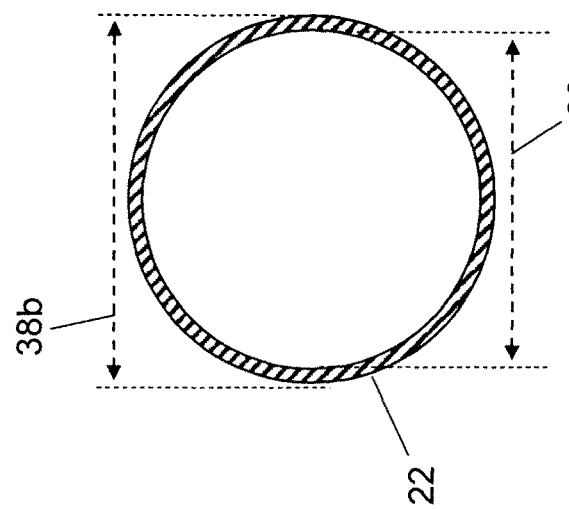
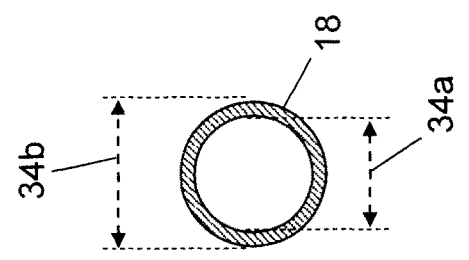
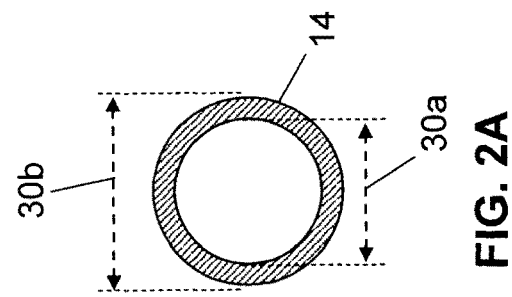
FIG. 1B
FIG. 2A
FIG. 2B
FIG. 2C

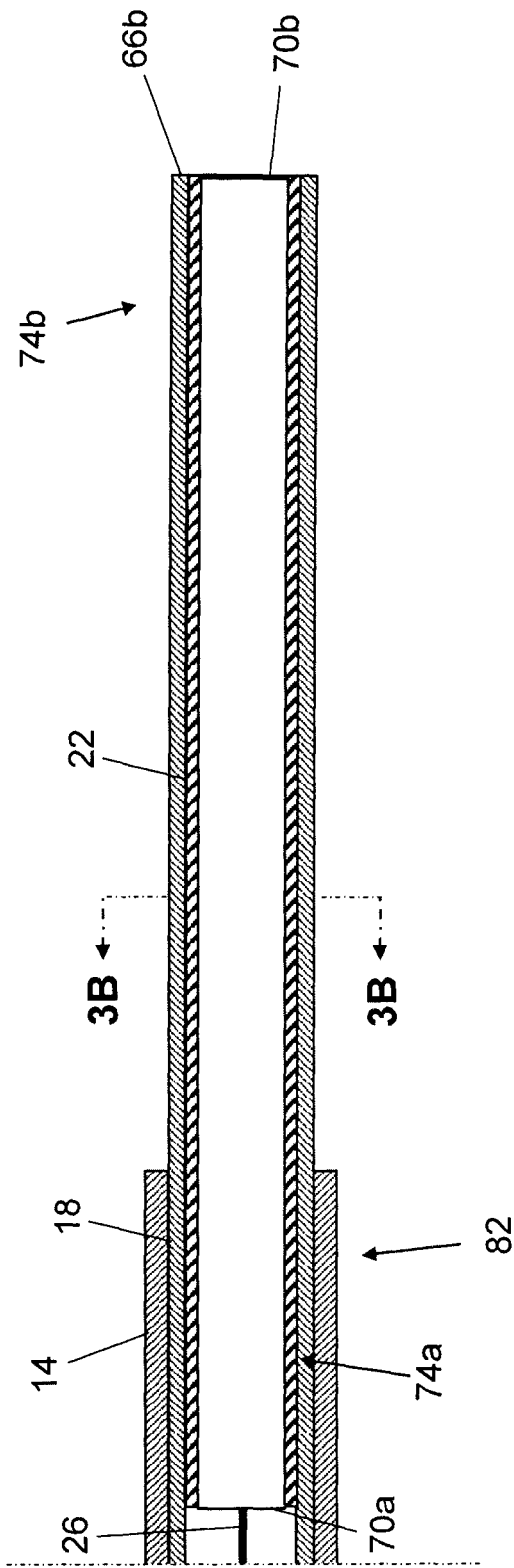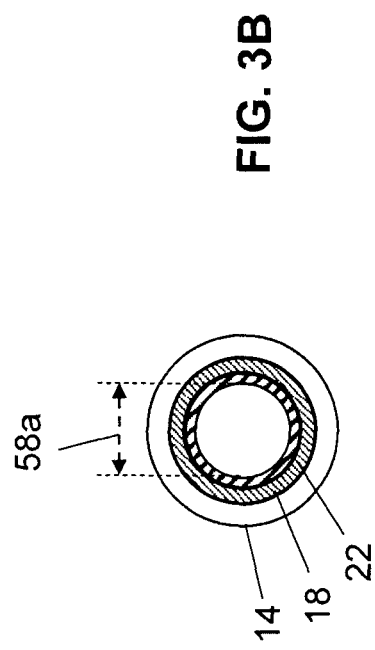

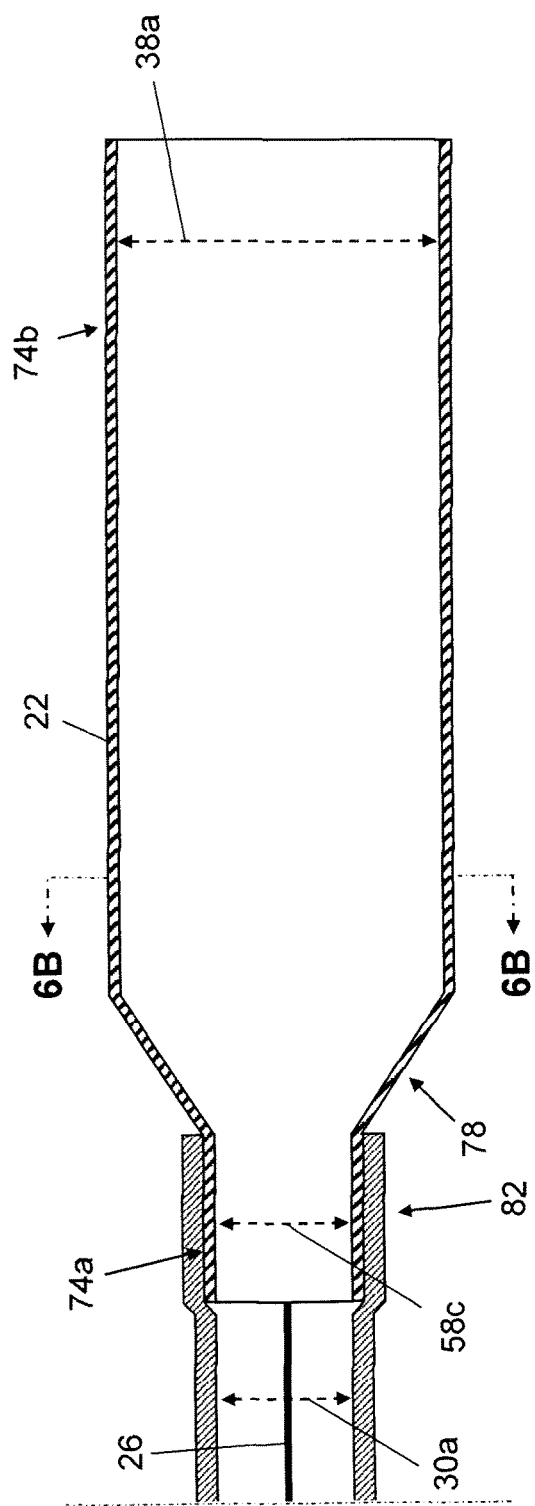
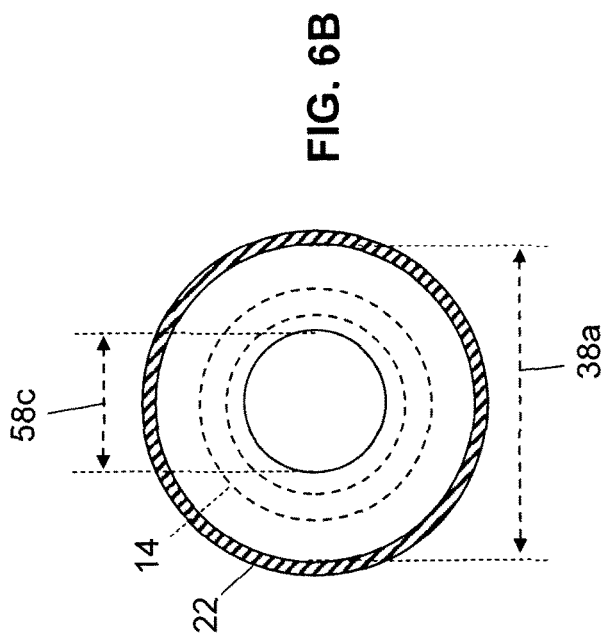
FIG. 6A
FIG. 6B

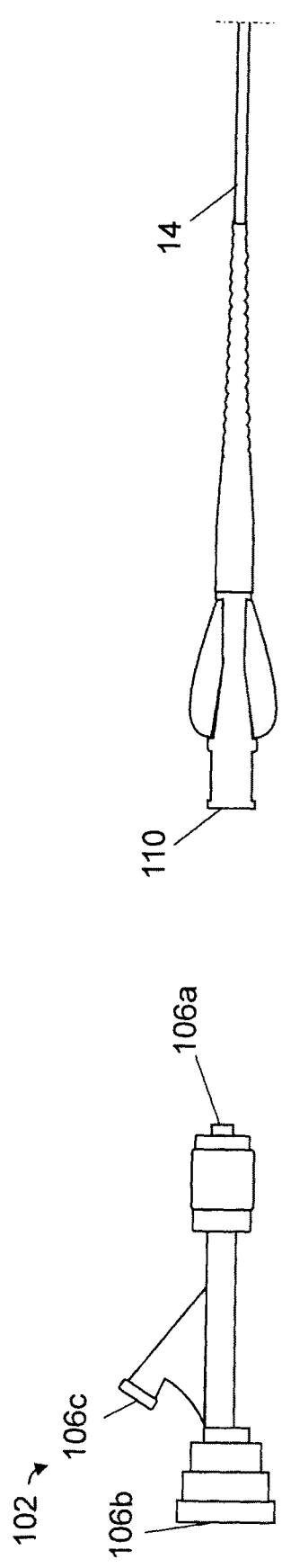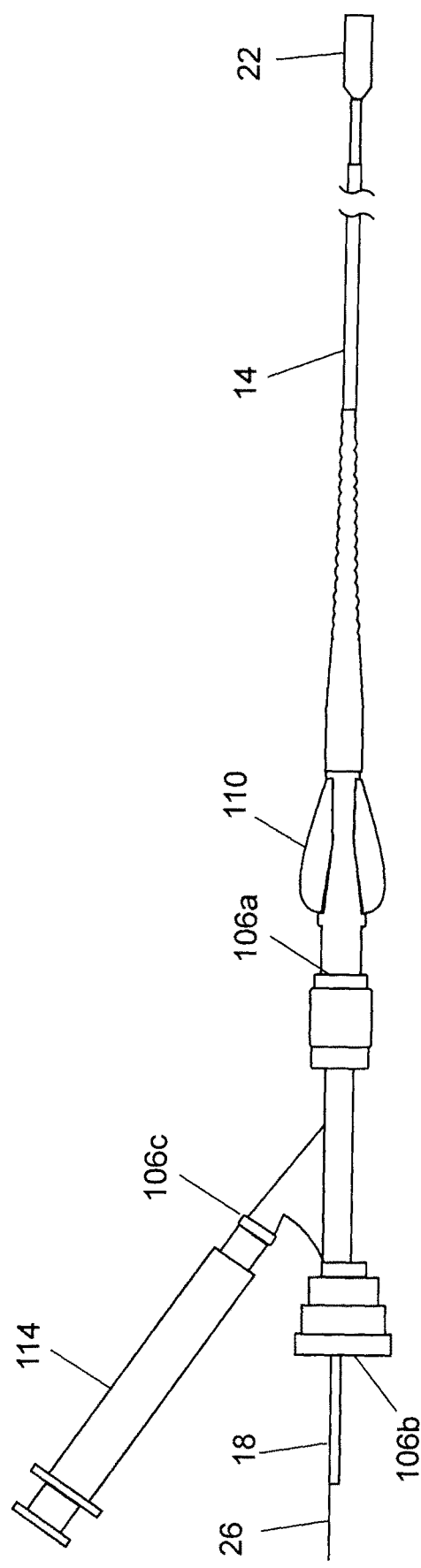
FIG. 9A
FIG. 9B
FIG. 9C

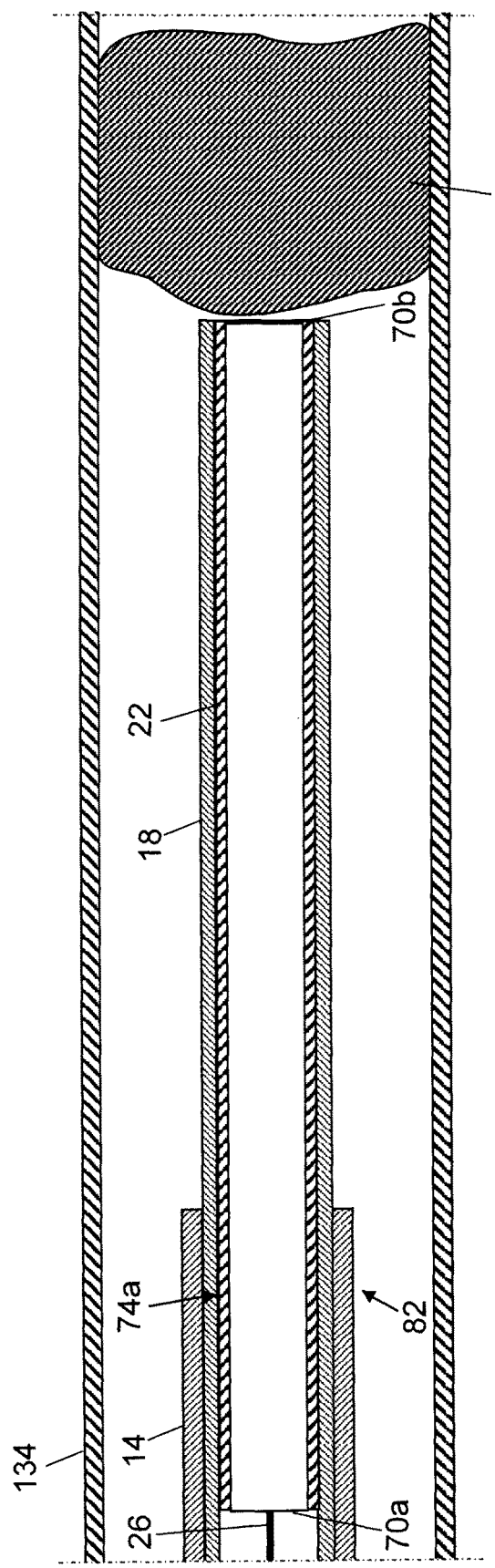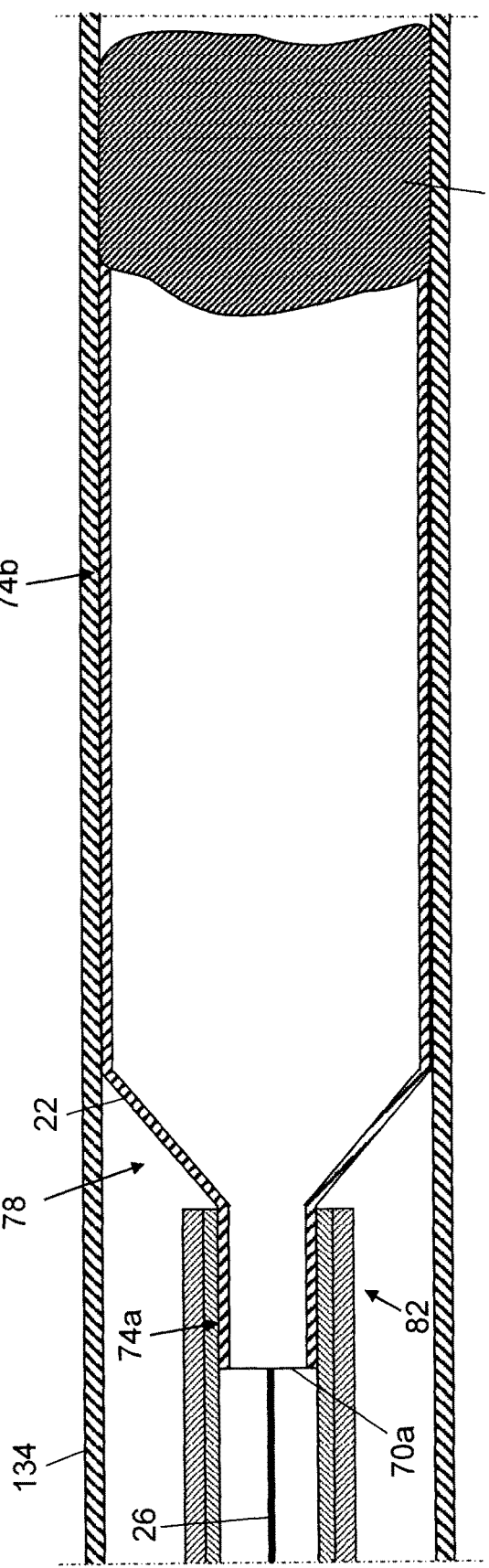

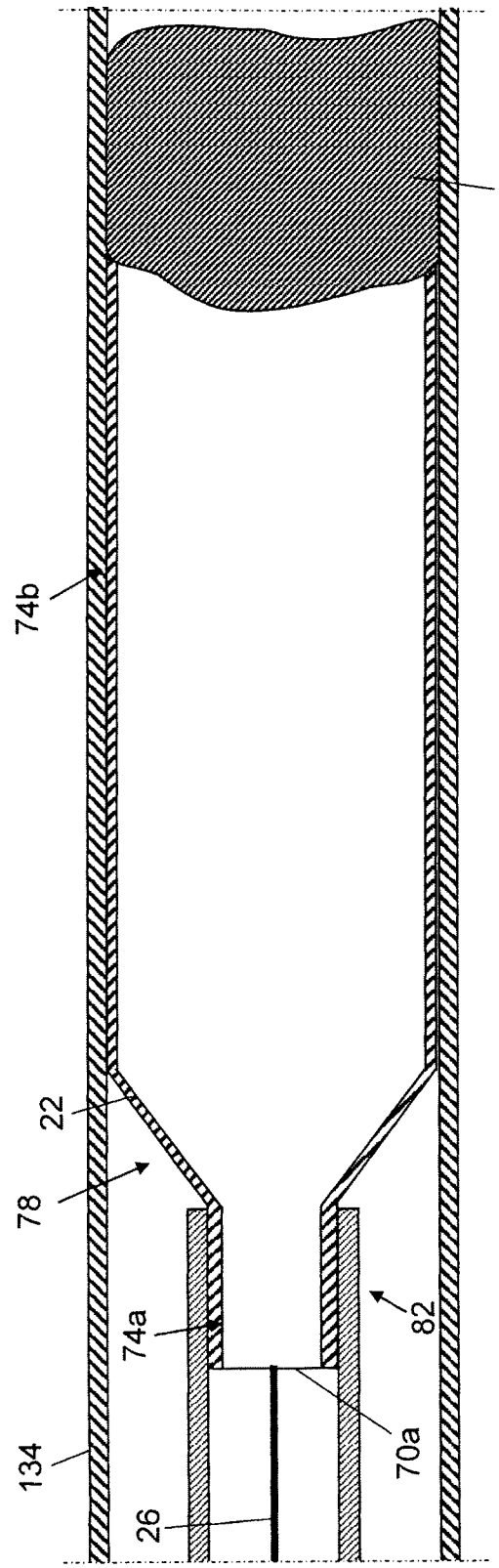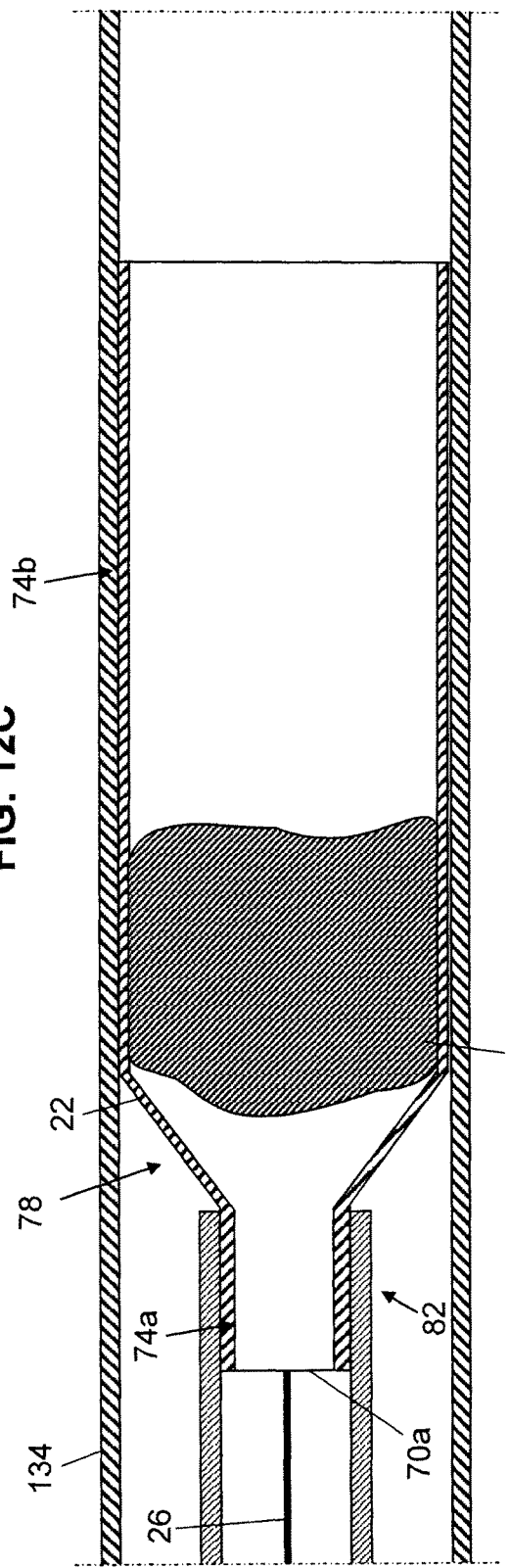

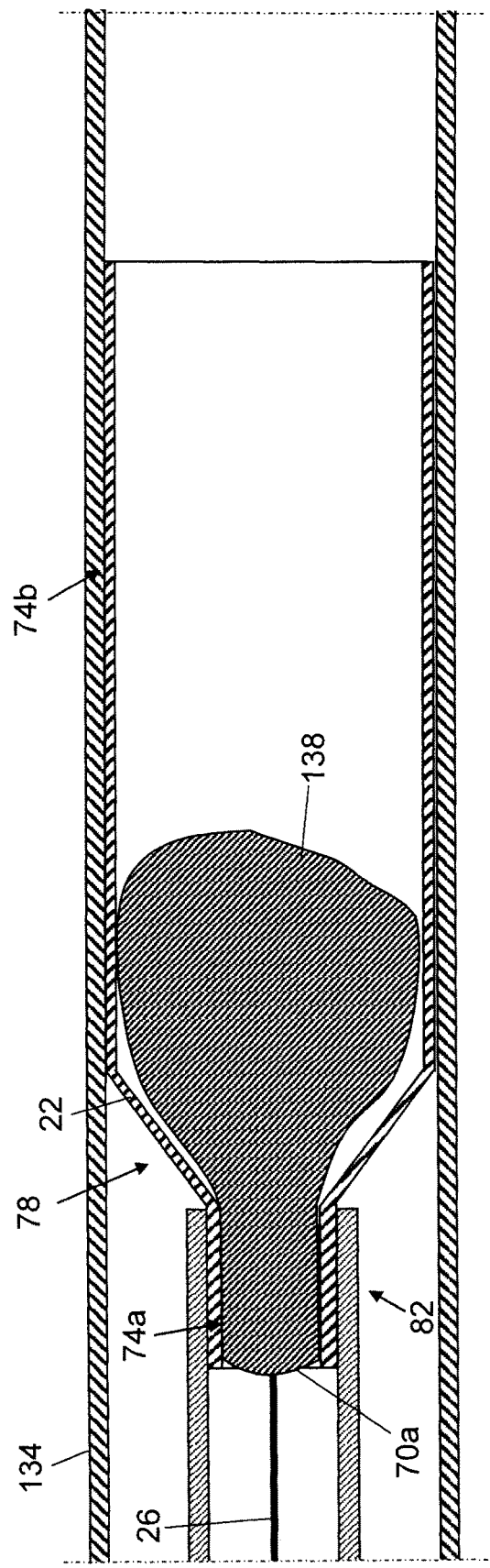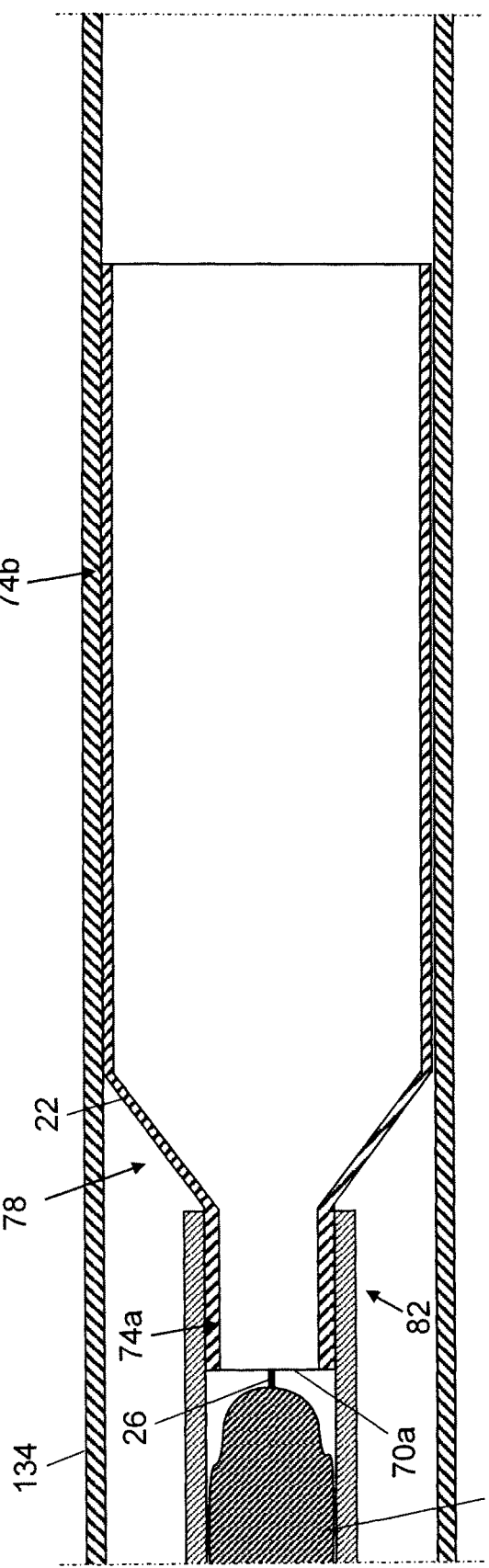

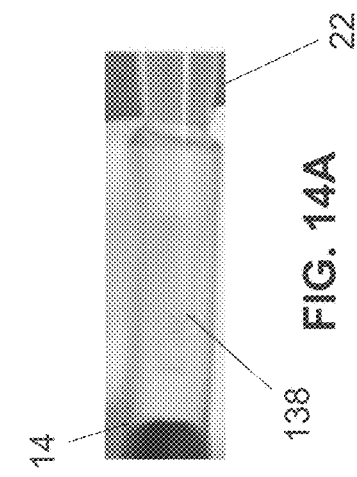
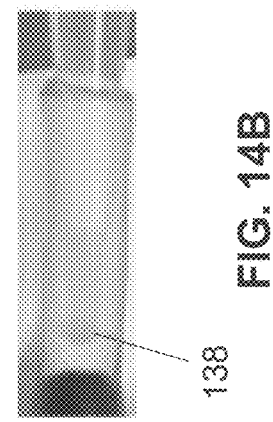
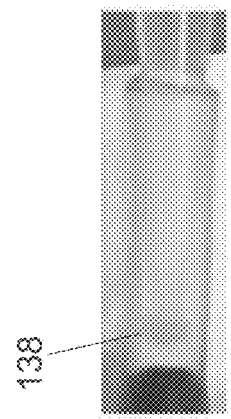
FIG. 14A  FIG. 14B  FIG. 14C
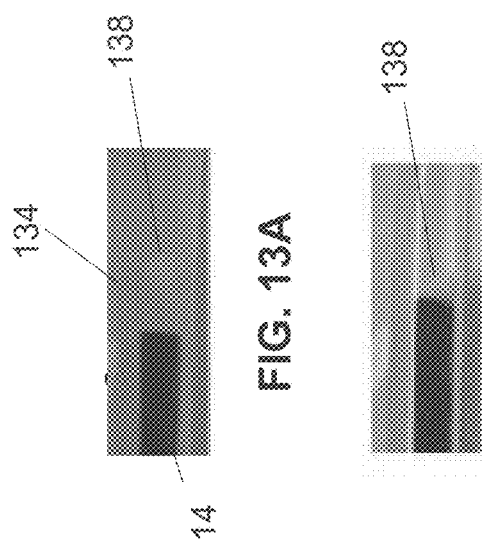
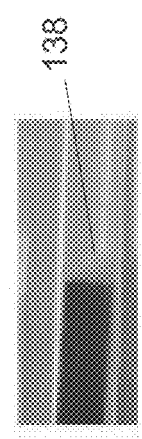
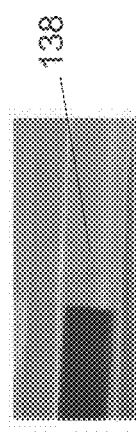
FIG. 13A  FIG. 13B  FIG. 13C  FIG. 13D

THROMBUS ASPIRATION SYSTEMS AND RELATED METHODS

CROSS-REFERENCE TO RELATED APPLICATIONS

This application claims priority to U.S. Provisional Application No. 63/091,258, entitled "THROMBUS ASPIRATION SYSTEMS AND RELATED METHODS," filed Oct. 13, 2020, the content of which is incorporated by reference in its entirety.

FIELD OF INVENTION

The present invention relates generally to systems for thrombus removal and, more specifically, to systems suitable for removing thrombi via aspiration.

BACKGROUND

A thrombus (also referred to as a blood clot) can block the flow of blood through a vessel, thereby depriving tissues of blood and oxygen and causing damage thereto. Thrombi are the predominant cause of strokes, which require prompt treatment to mitigate the risk of long-term disability and death.

A thrombectomy is a common procedure for treating strokes. In a thrombectomy, a guide catheter is inserted into a patient's vasculature at the groin and advanced therethrough toward the thrombus. A stent retriever can then be passed through the guide catheter and engage the thrombus to capture it; once the thrombus is captured, the stent retriever and catheter can be removed to restore blood flow to the brain. Alternatively, a small-bore aspiration catheter can be passed through the guide catheter and, when its distal end is at the thrombus, a vacuum can be applied at the catheter's proximal end to draw the thrombus against the aspiration catheter's mouth for removal. Over the past decade, thrombectomies have improved the stroke treatment success rate, with about 85% of the procedures achieving recanalization.

However, the inventor has recognized a number of challenges that have prevented successful recanalization in all thrombectomies. For example, blood flow against a thrombus acts to impede removal. While some have attempted to address this with a balloon guide catheter at the internal carotid artery (ICA) that blocks ICA blood flow to the thrombus, other vessels can continue to supply blood to the neurovasculature and thereby continue to impede thrombus removal.

Additionally, thrombi include (1) white thrombi that predominantly comprise platelets and (2) red thrombi that predominantly comprise red blood cells. These different thrombi compositions yield different mechanical properties, with white thrombi tending to have a higher Young's modulus and tensile strength and red thrombi tending to have a lower Young's modulus and tensile strength. Accordingly, stent retrievers can readily achieve mechanical engagement with red thrombi for removal, but may not be able to capture white thrombi, which are harder than red thrombi.

Aspiration catheters can maintain a hold of thrombi at the mouth thereof when the vacuum is applied, even if a stent retriever would not be able to mechanically engage such thrombi. But aspiration catheters face challenges as well. Because aspiration catheters must be able to access the vasculature in which a thrombus is located—commonly the ICA or the middle cerebral artery (MCA) (e.g., the M1 segment thereof), for strokes—they usually are relatively narrow, having a diameter that is less than 50% of the diameter of the blood vessel. Such narrow aspiration catheters may not be able to ingest a stroke-inducing thrombus that spans across the blood vessel. As a result, thrombus removal is often achieved by retracting the aspiration catheter with most of the thrombus disposed outside of its lumen, rather than by allowing the vacuum source to draw the thrombus through the lumen. The exposed thrombus is at risk of detachment during catheter withdrawal, which can result in failed recanalization.

Some have improved aspiration success rates with larger-diameter aspiration catheters whose design allows them to reach the target vasculature despite their size. For example, while aspiration catheters commonly had an internal diameter of 0.066", MicroVention, Inc. developed the SOFIA™ Plus catheter that has a 0.070" internal diameter but can reach the MCA, and Perfuze Ltd. is developing the Millipede CIS catheter that has an internal diameter of 0.088". While these aspiration catheters have larger lumen cross-sectional areas and thus can yield larger suction forces during aspiration, they still may not be able to ingest thrombi, which often have a diameters that are around twice as large (e.g., around 0.157").

Another approach to aspiration includes advancing a self-expanding stent disposed within a small-diameter sheath to a thrombus and deploying the stent distally out of the sheath such that a distal portion of the stent expands radially to the artery wall. In this manner, the stent can ingest the thrombus through its expanded mouth. One example of such a device is the Anaconda Biomed S.L. ANCD Advanced Thrombectomy System. While such devices can have an expanded mouth through which a thrombus may readily pass, their stent narrows at a proximal portion thereof to a diameter than is smaller than that of the sheath to which the stent is attached. For example, the stent of the ANCD Advanced Thrombectomy System narrows down to a 0.043" internal diameter. This constriction can impede ingestion of the thrombus through the sheath during aspiration.

Accordingly, there is a need in the art for thrombectomy systems that can better ingest thrombi to increase the likelihood of successful recanalization.

SUMMARY

The present systems address this need in the art with a first tube, a second tube that is slidable within the first tube, and a self-expanding receiver positioned at least partially within the second tube. The first tube can have a relatively large internal transverse dimension (e.g., at least approximately 0.090") and can be inserted into a patient's vasculature at the groin and advanced to or before the patient's ICA. The receiver and second tube—which is narrower than the first tube—can be passed through the first tube and beyond the distal end thereof to reach a thrombus in the patient's neurovasculature. The receiver can then be pushed distally (e.g., via a pusher wire connected thereto or a pusher coil) and/or the second tube can be pulled proximally such that a distal portion of the receiver advances beyond the second tube's distal end and thereby expands radially to contact the artery wall. In contrast with current systems, the second tube can be withdrawn from the first tube to permit a proximal portion of the receiver to radially expand to the inner wall of the first tube. The receiver's proximal portion, while narrower than the expanded distal portion thereof, can thus have an internal transverse dimension larger than that of selfexpandable stents used in current thrombectomy systems (e.g., at least approximately 0.071").

With a larger throat, the receiver can more readily ingest and pass the thrombus to the first tube when a vacuum is applied at the proximal end thereof, thereby allowing the vacuum source to draw the thrombus through the first tube's lumen for removal. The narrowing transition between the distal and proximal portions of the receiver can facilitate thrombus ingestion into the first tube, which might not otherwise occur with an aspiration catheter like the SOFIA™ Plus or Millipede CIS that does not include a receiver with a distal portion expanded to the artery wall.

To further promote thrombus ingestability, the first tube can have a radially-expandable distal end portion such that the receiver's proximal portion, when expanded to the first tube's inner wall, causes the radially-expandable distal end portion to expand. With such expansion, an internal transverse dimension of the receiver's proximal portion can be at least as large as that of the first tube at a location proximal of its distal end portion (e.g., at least approximately 0.090"), yielding a throat that is even more amenable to thrombus ingestion.

In this manner, the second tube and receiver can have a narrow profile during insertion to facilitate access to a thrombus that is disposed at a location that the larger-diameter first tube may not be able to readily access, and the receiver can expand at both its distal and proximal ends to the larger blood vessel and first tube walls, respectively, for aspiration such that thrombus removal through the first tube can be achieved.

Some of the present systems for use in blood clot removal comprise a first tube, a second tube, and a self-expanding receiver. The second tube, in some systems, is slidable within the first tube. The self-expanding receiver, in some systems, is positioned at least partially within the second tube. In some systems, the receiver is radially expandable. In some of such systems, when the second tube and a proximal portion of the receiver are positioned within a distal end portion of the first tube and the second tube is moved proximally relative to the receiver until a distal end of the second tube is positioned proximally of a proximal end of the receiver, the proximal portion of the receiver radially expands and makes contact with the distal end portion of the first tube and a distal portion of the receiver radially expands such that it has an inner diameter that is larger than an inner diameter of the first tube, optionally as at least 10% larger than an inner diameter of the first tube. In some methods, the receiver includes a transition portion that narrows between the distal portion of the receiver and the proximal portion of the receiver.

Some systems comprise a multi-port adapter having a first port, a second port, and a third port. In some systems, the first tube has a proximal fitting and the first port is configured to be coupled to the proximal fitting of the first tube. The second port, in some systems, is configured to seal around a cylindrical structure positioned therethrough. The third port, in some systems, has a luer lock.

Some systems comprise a vacuum source. In some systems, the vacuum source is coupleable to the luer lock of the third port of the multi-port adapter.

Some systems comprise a guidewire positionable within a lumen of, and movable relative to, the second tube.

Some of the present methods for blood clot removal comprise advancing a first tube through vasculature of a patient and advancing through the first tube a second tube in which a self-expanding receiver is positioned in a constrained orientation until a proximal portion of the receiver is positioned within a distal end portion of the first tube. Some methods comprise moving the second tube proximally relative to the receiver at least until a distal end of the second tube is proximal of a proximal end of the receiver, a distal portion of the receiver expands and makes contact with a blood vessel, and the proximal portion of the receiver contacts the distal end portion of the first tube. In some of such methods, the contact the distal portion of the receiver makes with the blood vessel is sufficient to occlude blood flow in the blood vessel. Some methods comprise applying a vacuum to the first tube. Application of the vacuum, in some methods, aspirates a blood clot into the receiver. Some of such methods comprise aspirating the clot through the receiver and into the first tube and withdrawing the receiver into the first tube. Some methods comprise withdrawing the first tube, the receiver, and the blood clot from the patient.

In some embodiments, the distal end portion of the first tube is radially expandable. In some of such embodiments, the proximal portion of the receiver is capable, when in contact with the radially-expandable distal end portion of the first tube, of causing the radially-expandable distal end portion to radially expand, optionally such that the proximal portion of the self-expanding receiver comprises an inner diameter that is at least as great as an inner diameter of the first tube at a location proximal of the radially-expandable distal end portion. In some methods, the proximal portion of the receiver causes such radial expansion of the distal end portion of the first tube.

In some embodiments, the self-expanding receiver has a membrane. The membrane, in some embodiments, comprises polytetrafluoroethylene. In some embodiments, the membrane comprises urethane. The receiver, in some embodiments comprises struts. In some embodiments, the receiver comprises nitinol. The receiver, in some embodiments, has a radiopaque marker positioned within 1 millimeter or less of a distal end of the receiver and/or a radiopaque marker positioned within 1 millimeter or less of a proximal end of the receiver.

In some embodiments, the system comprises a pusher. Some methods comprise, during at least some of the moving applying pressure to the receiver through the pusher. The pusher, in some embodiments, comprises a pusher wire connected to the receiver. In some embodiments, the pusher is positionable within the second tube and sized to make contact with the proximal end of the receiver within the second tube. The pusher, in some embodiments, is not connected to the receiver. In some of such embodiments, the method comprises withdrawing the pusher.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the terms "substantially" and "approximately" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, a product or system that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the products, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 1B depicts the system of FIG. 1A in an insertion configuration in which the second tube is disposed within the first tube and the receiver is compressed and disposed within the second tube.

FIG. 2A is a cross-sectional view of the first tube taken along line 2A-2A of FIG. 1A.

FIG. 2B is a cross-sectional view of the second tube taken along line 2B-2B of FIG. 1A.

FIG. 2C is a cross-sectional view of the receiver taken along line 2C-2C of FIG. 1A, where the receiver is in its expanded state.

FIG. 3A is a partial cross-sectional view of the system of FIG. 1A taken along line 3A-3A of FIG. 1B, where the system is in the insertion configuration.

FIG. 3B is a cross-sectional view of the system of FIG. 1A taken along line 3B-3B of FIG. 3A.

FIG. 6A is a partial cross-sectional view of a second embodiment of the present systems that is substantially the same as the system of FIG. 1A, except that the FIG. 6A system's first tube has a radially-expandable distal end portion that can be expanded by the receiver's proximal portion when the system is in the second deployment configuration.

FIG. 6B is a cross-sectional view of the system of FIG. 6A taken along line 6B-6B.

FIG. 9A is a side view of a multi-port adapter having a first port that is configured to be coupled to a proximal fitting of the first tube, a second port configured to seal around a cylindrical structure passed therethrough, and a third port configured to be coupled to a vacuum source.

FIG. 9B is a side view of a first tube with a proximal fitting that can be attached to the first port of the multi-port adapter of FIG. 9A.

FIG. 9C is a side view of the first tube with its proximal fitting attached to the first port of the multi-port adapter, the second tube disposed through the second port of the multi-port adapter and within the first tube, the receiver partially disposed within the second tube in a deployed position, and a vacuum source comprising a syringe that is attached to the third port of the multi-port adapter.

FIG. 12A is a partial cross-sectional view of the FIG. 1A system disposed in the FIG. 11A vasculature, where the system is in the insertion configuration such that the distal ends of the second tube and the receiver are positioned at the thrombus.

FIG. 12B is a partial cross-sectional view of the FIG. 1A system disposed in the FIG. 11A vasculature, where the system is in the first deployed configuration such that the distal end of the receiver is positioned at the thrombus and expanded to the vessel wall.

FIG. 12C is a partial cross-sectional view of the FIG. 1A system disposed in the FIG. 11A vasculature, where the system is in the second deployed configuration in which the second tube is withdrawn from the first tube such that the receiver's proximal portion is in contact with the first tube's inner wall.

FIG. 12D is a partial cross-sectional view of the FIG. 1A system disposed in the FIG. 11A vasculature, where a vacuum is applied to the first tube while the system is in the second deployed configuration such that the thrombus moves within the receiver and to its transition section.

FIG. 12E is a partial cross-sectional view of the FIG. 1A system disposed in the FIG. 11A vasculature, where the thrombus is drawn into the receiver's proximal portion within the first tube as the vacuum is applied to the first tube.

FIG. 12F is a partial cross-sectional view of the FIG. 1A system disposed in the FIG. 11A vasculature, where the thrombus is drawn into the first tube's lumen as the vacuum is applied to the first tube.

FIGS. 13A-13D depict an experiment in which aspiration of a model white thrombus through a 1.5-mm-diameter catheter was attempted. As shown, the model thrombus could not be ingested through the catheter mouth.

FIGS. 14A-14C depict an experiment in which a model white thrombus was aspirated through a funnel connected to a 1.5-mm-diameter catheter's distal end. As shown, the model thrombus was able to pass through the funnel's 1.0-mm-diameter throat.

DETAILED DESCRIPTION

Figure 1A:
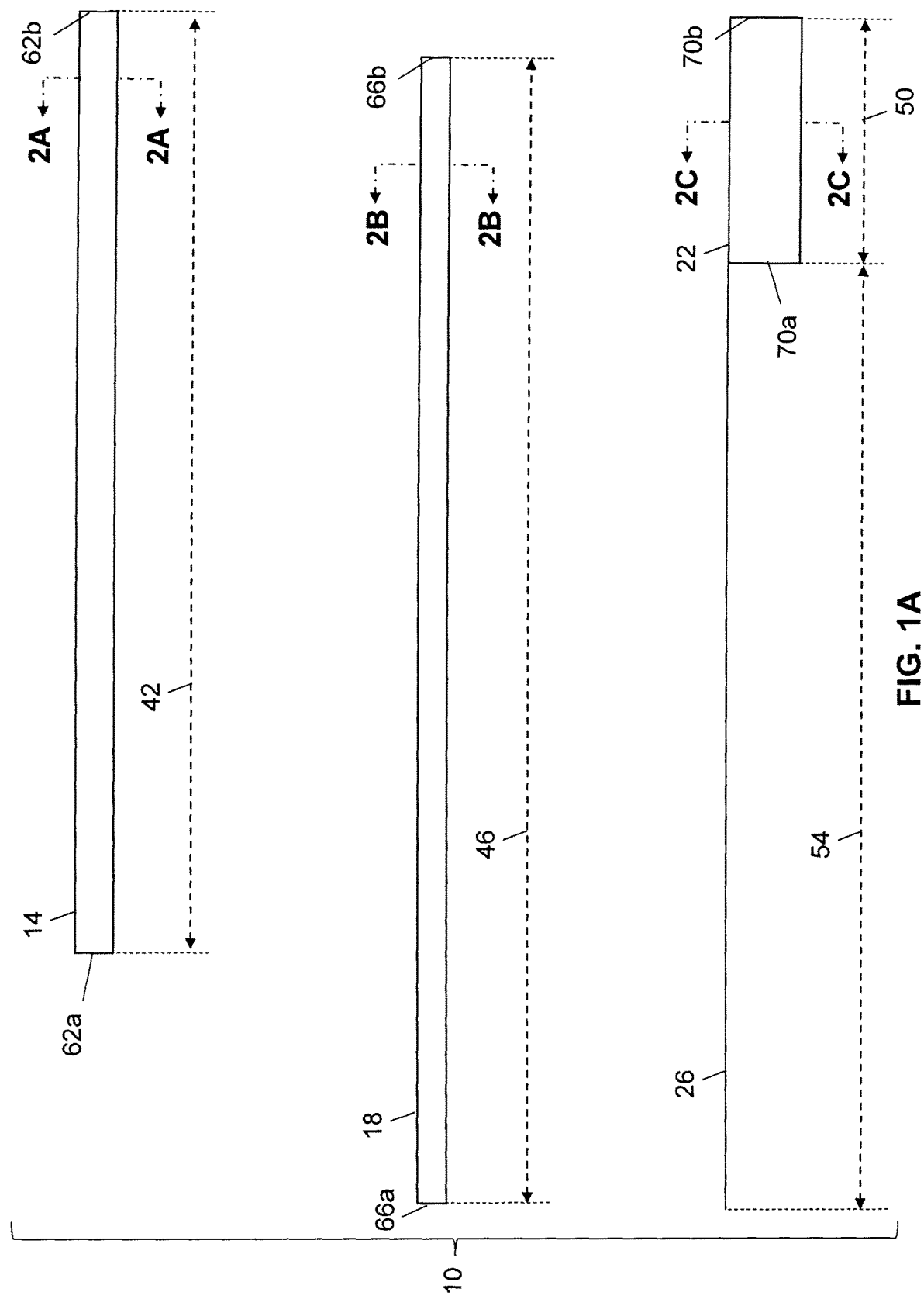
FIG. 1A is a side view of one of the present systems for removing a thrombus that includes a first tube, a second tube that is slidable within the first tube, and a self-expanding receiver with a pusher wire connected thereto.

Referring to FIGS. 1A and 1B, shown is a first embodiment 10 of the present systems for thrombus removal that includes a first tube 14, a second tube 18, and a self-expanding receiver 22. First and second tubes 14 and 18 can each comprise, for example, a catheter or sheath defining a lumen that extends between the proximal (e.g., 62a, 66a) and distal (e.g., 62b, 66b) ends thereof. As shown in FIG. 1B, second tube 18 is disposable within the lumen of first tube 14. Receiver 22 can be compressed from its expanded state (FIG. 1A) and positioned at least partially within the lumen of second tube 18 (FIG. 1B).

First tube 14, second tube 18, and self-expanding receiver 22 can be sized such that system 10 can reach and remove a thrombus from a patient's neurovasculature, such as in the ICA or MCA (e.g., in the M1 segment thereof). Referring additionally to FIGS. 2A-2C, first and second tubes 14 and 18 can each have internal and external transverse dimensions (e.g., diameters) 30a, 34a and 30b, 34b, respectively. First tube 14's internal transverse dimension 30a can be greater than or equal to any one of, or between any two of, 0.070", 0.075", 0.080", 0.085", 0.090", 0.095", or 0.100" (e.g., at least 0.085" or at least approximately 0.090") and its external transverse dimension 30b can be greater than or equal to any one of, or between any two of, 0.080", 0.085", 0.090", 0.095", 0.100", 0.105", or 0.110" (e.g., at least 0.100") (e.g., the first tube can be an 8 F catheter or a 6 F sheath). Each dimension herein provided in an English unit may be translated to the corresponding metric unit by rounding to the nearest millimeter. With such transverse dimensions, first tube 14 can have sufficient flexibility to facilitate access up to the ICA, while having a relatively large internal transverse dimension 30a to facilitate aspiration as described in further detail below. To travel up to the ICA from an insertion point at a patient's groin, a length 42 of first tube 14 can be greater than or equal to any one of, or between any two of, 70 cm, 80 cm, 90 cm, 100 cm, 110 cm, 120 cm, or 130 cm (e.g., at least 90 cm).

External transverse dimension 34b of second tube 18 can be smaller than first tube 14's internal transverse dimension 30a such that the second tube can slide within the first tube and access the narrower vessels of a patient's neurovasculature, such as in the ICA or MCA (e.g., the M1 segment). For example, second tube 18's external transverse dimension 34b can be less than or equal to any one of, or between any two of, 0.095", 0.090", 0.085", 0.080", 0.075", 0.070", or 0.065" (e.g., less than 0.085") and its internal transverse dimension 34a can be less than or equal to an one of, or between any two of, 0.090", 0.085", 0.080", 0.075", 0.070", 0.065", or 0.060" (e.g., less than 0.080") (e.g., the second tube can be a 6 F catheter or a 4 F sheath). Additionally, second tube 18's length 46 can be longer than length 42 of first tube 14 such that the second tube can be advanced past the first tube's distal end 62b to reach the thrombus. For example, length 46 can be greater than or equal to any one of, or between any two of, 90 cm, 100 cm, 110 cm, 120 cm, 130 cm, 140 cm, or 150 cm (e.g., at least 110 cm).

As shown in FIG. 2C, when in its expanded state receiver 22 can have internal and external transverse dimensions (e.g., diameters) 38a and 38b that are larger than those of first and second tubes 14 and 18. For example, when fully expanded, receiver 22's internal transverse dimension 38a can be at least 10%, 20%, 30%, 40%, 50%, 60%, 70%, 100%, or 200% larger than first tube 14's internal transverse dimension 30a, such as greater than or equal to any one of, or between any two of, 0.100", 0.125", 0.150", 0.175", 0.200", 0.225", or 0.250" (e.g., at least 0.125") and its external transverse dimension 38b can be greater than or equal to any one of, or between any two of, 0.150", 0.175", 0.200", 0.225", 0.275", or 0.300" (e.g., at least 0.175"). As sized, receiver 22 can radially expand to contact the vessel walls in a patient's neurovasculature, thereby facilitating thrombus ingestion as described in further detail below.

Referring additionally to FIGS. 3A and 3B, while receiver 22 is wider than first and second tubes 14 and 18 when in its expanded state, it can be compressed and positioned at least partially within the second tube such that it can be advanced through the first tube and readily transported to the thrombus using the second tube. When in second tube 18, receiver 22 can be in contact with the second tube's inner wall such that the receiver's compressed external transverse dimension is equal to the second tube's internal transverse dimension 34a. Receiver 22 can also have a first compressed internal transverse dimension 58a that is smaller than its uncompressed internal transverse dimension 38a, such as a first compressed internal transverse dimension that less than or equal to any one of, or between any two of, 80%, 70%, 60%, 50%, 40%, or 30% of the uncompressed internal transverse dimension.

Receiver 22 can have a length 50 that, while shorter than lengths 42 and 46 of first and second tubes 14 and 18, permits it to extend from a distal end portion 82 of the first tube to a thrombus in the patient's neurovasculature. For example, length 50 can be greater than or equal to any one of, or between any two of, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, or 25 cm. To permit manipulation of receiver 22 (e.g., for deployment out of second tube 18) while the receiver is disposed within the patient, system 10 can comprise a pusher 26 that can be connected to a proximal end 70a of the receiver. Lengths 50 and 54 of receiver 22 and pusher 26 can together be longer than length 42 of first tube 14 and length 46 of second tube 18 such that the pusher extends out of the first and second tubes' proximal ends 62*a* and 66*a* while the receiver is disposed at or at least partially beyond the first tube's distal end 62*b* (FIG. 1B). For example, pusher 26's length 54 can be greater than or equal to any one of, or between any two of, 80 cm, 90 cm, 100 cm, 110 cm, 120 cm, 130 cm, or 140 cm.

Figure 4A:
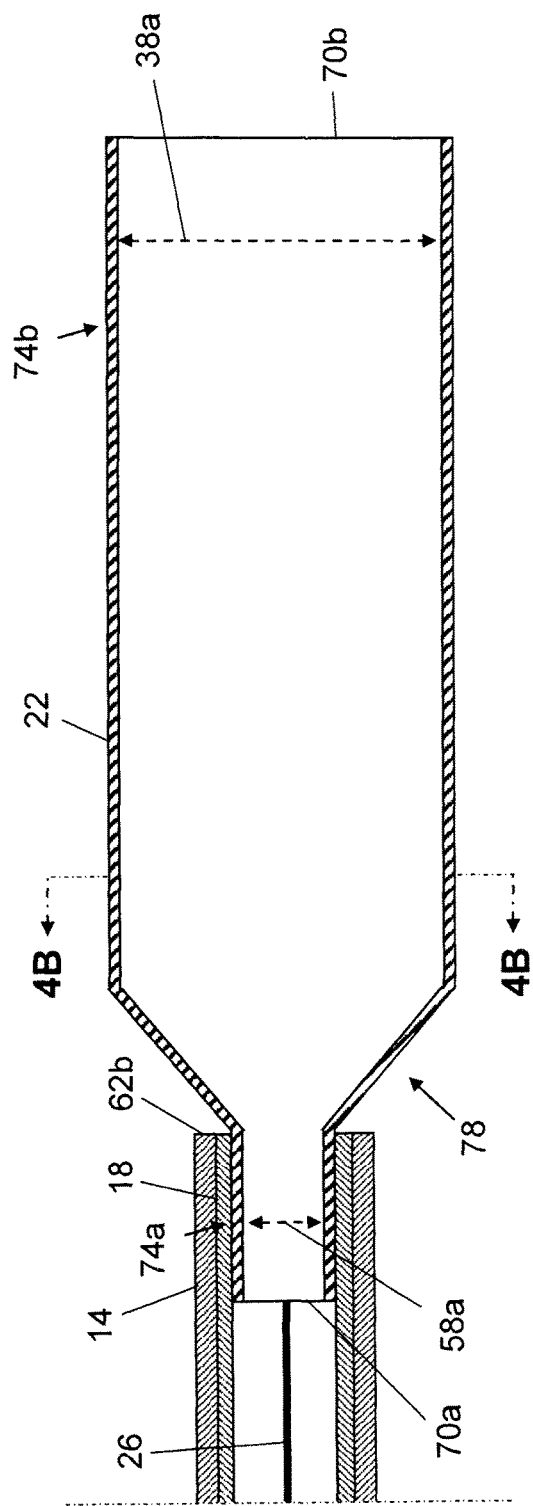
FIG. 4A is a partial cross-sectional view of the system of FIG. 1A in a first deployment configuration in which a proximal portion of the receiver is disposed within the second tube and a distal portion of the receiver is disposed beyond the second tube's distal end such that the receiver's distal portion is expanded and has a larger internal transverse dimension than its proximal portion.
Figure 4B:
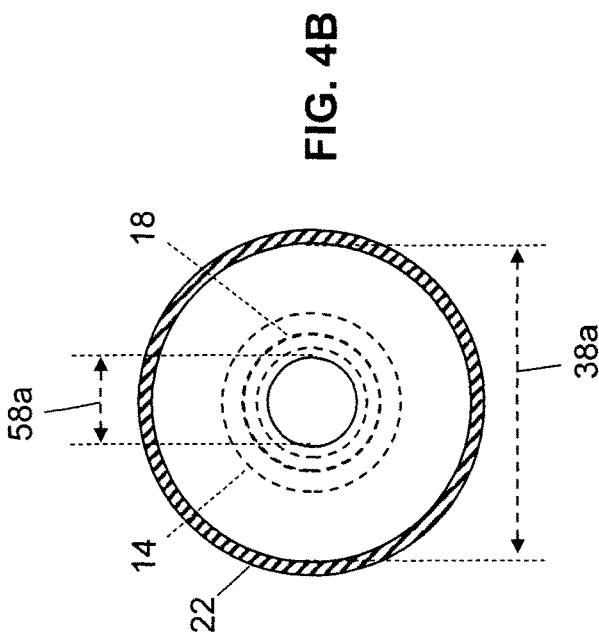
FIG. 4B is a cross-sectional view of the system of FIG. 1A taken along line 4B-4B of FIG. 4A.

Referring to FIGS. 4A and 4B, to permit deployment of receiver 22 for thrombus ingestion, the receiver can be slidable relative to second tube 18. In this manner, receiver 22 can be pushed distally (e.g., by applying pressure with pusher 26) and/or second tube 18 can be pulled proximally (e.g., from its proximal end 66*a* disposed outside of the patient) such that the receiver's distal end 70*b* is disposed distally of distal ends 62*b* and 66*b* of first and second tubes 14 and 18. When receiver 22 is deployed, its distal portion 74*b* can radially expand such that the internal transverse dimension thereof increases up to the receiver's maximum uncompressed internal transverse dimension 38*a*, promoting its ability to ingest a thrombus. The expanded distal portion 74*b* can engage with a patient's blood vessel wall, thereby arresting flow to the thrombus to facilitate removal thereof. Receiver 22's proximal end 70*a* can remain proximal of first tube 14's distal end 62*b* such that a proximal portion 74*a* of the receiver remains compressed, with a transition portion 78 of the receiver narrowing from the receiver's expanded distal portion 74*b* to its compressed proximal portion.

Figure 5A:
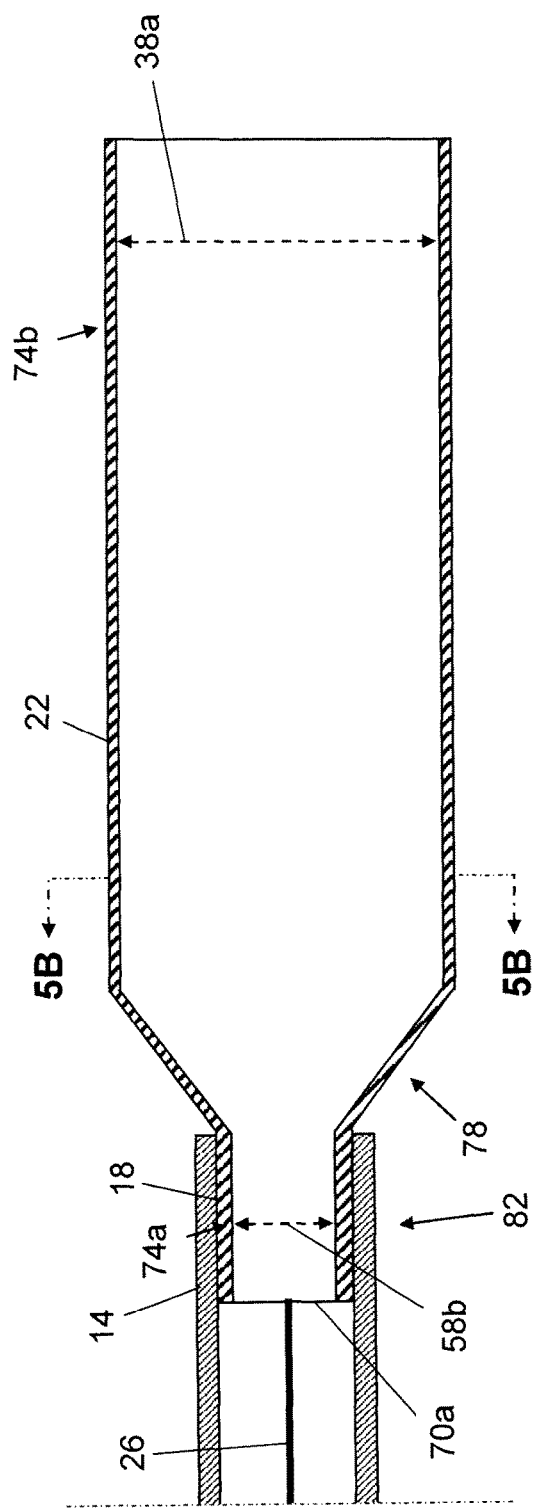
FIG. 5A is a partial cross-sectional view of the system of FIG. 1A in a second deployment configuration in which the second tube is removed from the first tube such that the proximal portion of the receiver is expanded to and in contact with the inner wall of the first tube.
Figure 5B:
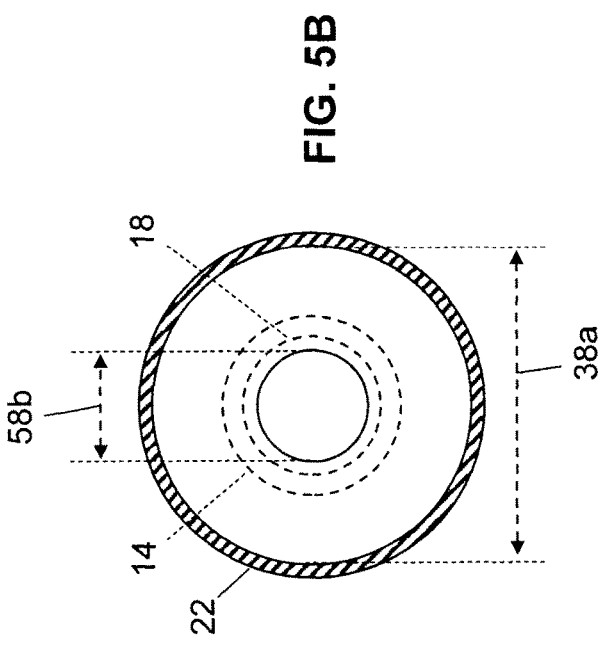
FIG. 5B is a cross-sectional view of the system of FIG. 1A taken along line 5B-5B of FIG. 5A.

As shown in FIGS. 4A and 4B, second tube 18 is disposed in first tube 14 such that it is in contact with and thus compresses receiver 22's proximal portion 74*a*. Proximal portion 74*a* of receiver 22 thus has an internal transverse dimension equal to first compressed internal transverse dimension 58*a*. However, referring additionally to FIGS. 5A and 5B, second tube 18 can be pulled proximally relative to receiver 22 and thus withdrawn from first tube 14 such that the receiver's proximal portion 74*a* (e.g., including at its proximal end 70*a*) can radially expand to the inner wall of the first tube's distal end portion. As a result, receiver 22's proximal portion 74*a* can have a second compressed internal transverse dimension 58*b* that is larger than first compressed internal transverse dimension 58*a*, such as at least 10%, 20%, 30%, 40%, 50%, or 60% (e.g., at least 40%) larger than the first compressed internal transverse dimension. For example, second compressed internal transverse dimension 58*b* can be greater than or equal to any one of, or between any two of, 0.055", 0.060", 0.065", 0.070", 0.075", 0.080", or 0.085" (e.g., at least 0.065" or at least approximately 0.071"), optionally where it is at least 40%, 50%, 60%, or 70% of receiver 22's uncompressed transverse dimension 38*a*. The expandability of receiver 22's proximal portion 74*a* can facilitate thrombus ingestion to first tube 14 when a vacuum is applied at the first tube's proximal end, and thus promote higher recanalization success rates than current expandable stent systems whose narrower throats impede ingestion.

Receiver 22's proximal portion 74*a* can engage and thereby create a seal with first tube 14's distal end portion 82 to impede blood flow into first tube 14's lumen when a vacuum is applied at the first tube's proximal end 62*a*. This engagement can also be sufficient to permit withdrawal of receiver 22 when first tube 14 is withdrawn from a patient's vasculature. Such engagement can be achieved via friction and/or fastening components coupled to receiver 22's proximal portion 74*a* and first tube 14's distal end portion 82. For example, receiver 22's proximal portion 74*a* can be configured to exert a pressure on first tube 14's distal end portion 82 that is greater than or equal to any one of, or between any two of, 40 kPa, 50 kPa, 60 kPa, 70 kPa, 80 kPa, 90 kPa, 100 kPa, or 110 kPa (e.g., between 50 and 100 kPa); such pressure can yield a seal between the receiver and first tube to impede blood flow at the interface therebetween and enough friction to maintain the connection between the receiver and first tube when they are withdrawn from a patient's vasculature.

Referring additionally to FIGS. 6A and 6B, in some embodiments first tube 14's distal end portion 82 is radially expandable. In such embodiments, receiver 22's proximal portion 74*a* can cause first tube 14's distal end portion 82 to radially expand when it comes in contact with and thus exerts pressure on the distal end portion. After expanding distal end portion 82, receiver 22's proximal portion 74*a* can have a third compressed internal transverse dimension 58*c* that is larger than second compressed internal transverse dimension 58*b*. As shown, receiver 22's proximal portion 74*a* can exert sufficient force on distal end portion 82 such that third compressed internal transverse dimension 58*c* is at least as large as first tube 14's internal transverse dimension 30*a* at a location proximal of the distal end portion, such as greater than or equal to any one of, or between any two of, 100%, 105%, 110%, 115%, or 120% of internal transverse dimension 30*a*. For example, third compressed internal transverse dimension 58*c* can be greater than or equal to any one of, or between any two of, 0.070", 0.075", 0.080", 0.085", 0.090", 0.095", or 0.100" (e.g., at least 0.085" or at least approximately 0.090"), and/or can be at least 50%, 60%, 70%, or 80% of receiver 22's uncompressed transverse dimension 38*a*. By yielding a larger throat, this additional expandability can further facilitate thrombus ingestion through receiver 22 and to first tube 14.

Figure 7:
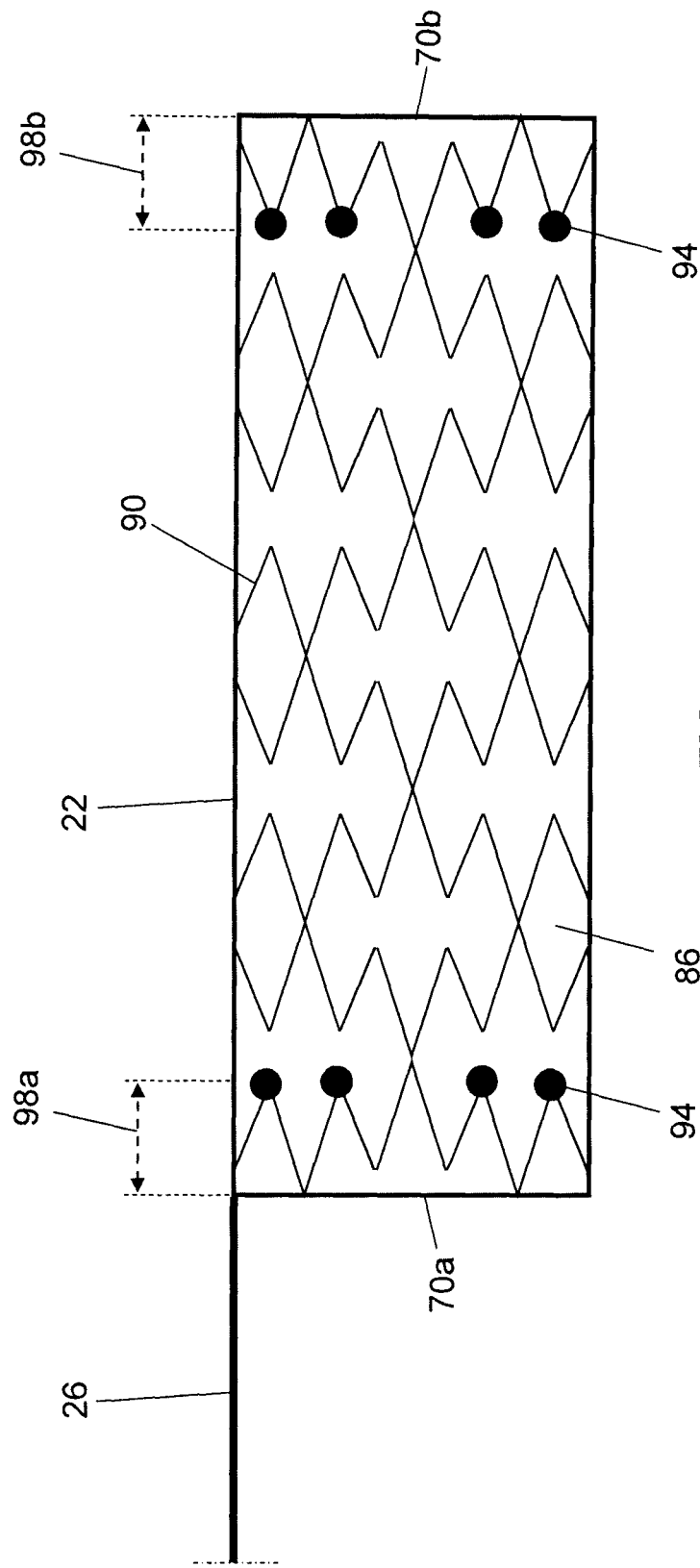
FIG. 7 is a side view of a receiver suitable for use in some of the present systems that includes a membrane, struts, and radiopaque markers.

Receiver 22 can have any suitable structure that yields the above-described expandability and permits the receiver to occlude flow between portions of a patient's blood vessel that are proximal and distal of the receiver. Referring to FIG. 7, for example, receiver 22 can comprise a membrane 86 that defines an outer surface thereof. Membrane 86 can be liquid-impermeable such that receiver 22, when its distal portion 74*b* expands and contacts the vessel wall, can impede blood flow to a thrombus while allowing fluid communication between the thrombus and first tube 14 for aspiration. Suitable materials for membrane 86 include polymers such as polytetrafluoroethylene (PTFE) and urethane. PTFE, for example, advantageously exhibits low friction with other surfaces and thus facilitates insertion and deployment of receiver 22.

To promote its expandability, receiver 22 can include struts 90. Struts 90 can be configured to urge radial expansion of receiver 22 when the receiver is radially compressed. For example, struts 90 can comprise nitinol (i.e., an alloy comprising nickel and titanium), which is superelastic such that the struts can regain their original shape when a mechanical load exerted thereon is released. Bonding between struts 90 and membrane 86 can be achieved in a variety of ways. As one example, receiver 22 can comprise a second membrane (e.g., comprising the same material as membrane 86, such as PTFE and/or urethane) that defines the receiver's inner wall and is adhered to membrane 86 such that struts 90 are disposed between the two membranes. Such a membrane configuration can facilitate a stronger membrane-strut connection, particularly when—as is preferred for the strut construction—membrane 86 comprises PTFE and struts 90 comprise nitinol. This is because the adhesion between the membranes that maintains struts 90 therebetween can be stronger than that between PTFE and nitinol. Nevertheless, struts 90 can be adhered to the inner wall of membrane 86 without a second membrane disposed on the other side thereof; while this configuration may not be as strong as the two-membrane configuration, it can yield adequate strength to withstand the forces exerted on receiver 22 during aspiration.

In other embodiments, receiver 22 can have a braided construction in which braided wires (e.g., comprising nitinol) are attached to membrane 86. In some of such embodiments, the braided wires can be encapsulated by membrane 86, which preferably comprises urethane for the braided construction.

Receiver 22 can also comprise one or more radiopaque markers 94. Radiopaque marker(s) 94 can inhibit the passage of X-rays therethrough and thus can be viewed via fluoroscopy when receiver 22 is disposed in a patient. For example, each radiopaque marker 94 can comprise tantalum or platinum. Radiopaque marker(s) 94 can thereby aid a physician in determining the position of receiver 22 in a patient's vasculature during insertion and deployment thereof. At least one radiopaque marker 94 can be disposed closer to receiver 22's distal end 70b than to its proximal end 70a, such as within a distance 98b of the distal end that is less than or equal to any one of, or between any two of, 5 mm, 4 mm, 3 mm, 2 mm, 1 mm, or 0.5 mm (e.g., less than or equal to 1 mm). Such distally-positioned radiopaque marker(s) 94 can assist a physician in determining receiver 22's position relative to a thrombus such that the receiver can be positioned adjacent thereto to achieve adequate engagement for aspiration. Additionally or alternatively, at least one radiopaque marker 94 can be disposed closer to receiver 22's proximal end 70a than to its distal end 70b, such as within a distance 98a of the proximal end that is less than or equal to any one of, or between any two of, 5 mm, 4 mm, 3 mm, 2 mm, 1 mm, or 0.5 mm (e.g., less than or equal to 1 mm). Such proximally-positioned radiopaque markers 94, in combination with the distally-positioned radiopaque markers, can allow a physician to determine the length of receiver 22 when deployed. In some embodiments, components of receiver 22 that span its length 50 (e.g., struts 90, collectively) can be radiopaque such that a least a portion thereof is visible along the receiver's length via fluoroscopy.

Figure 8A:
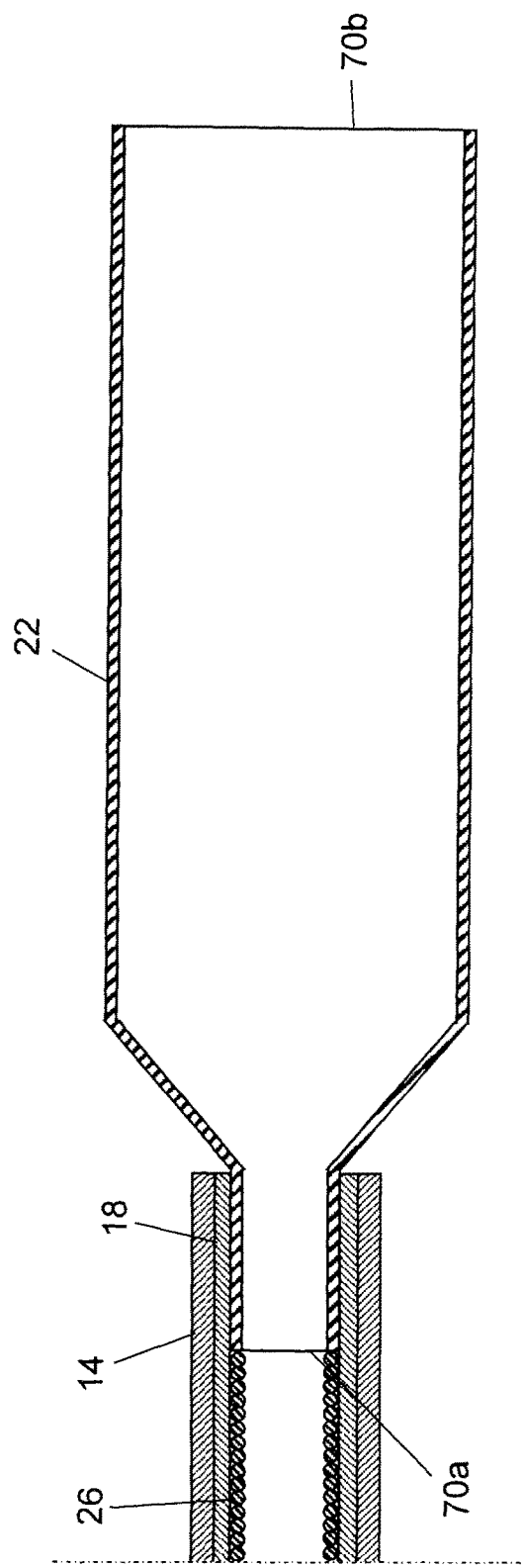
FIG. 8A is a partial cross-sectional view of a third embodiment of the present systems that is substantially the same as the system of FIG. 1A, except that the FIG. 8A's pusher is a coil that is not connected to the receiver.
Figure 8B:
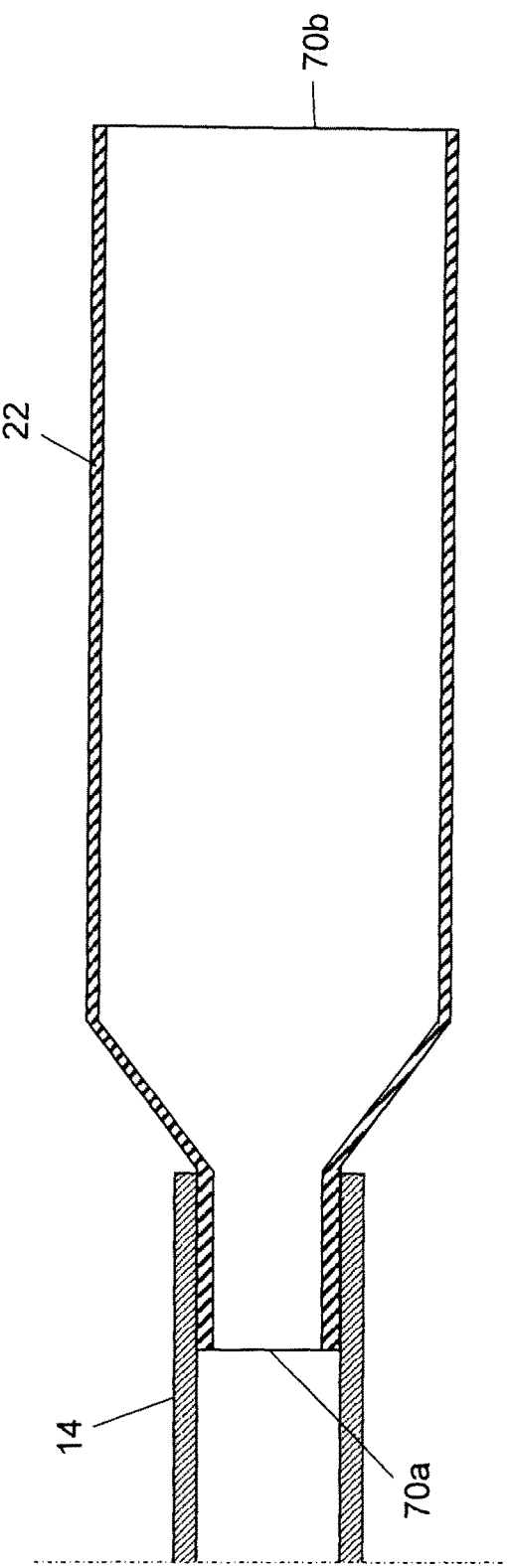
FIG. 8B is a partial cross-sectional view of the system of FIG. 8A with the pusher coil removed from the first tube.

As described above, a pusher 26 can be connected to receiver 22 such that the receiver can be advanced toward the thrombus. Such a pusher 26 can comprise a pusher wire comprising, for example, stainless steel, such as a wire that is traditionally used in guide wires. One suitable wire for pusher 26 is that used in the CHIKAI black18 Neurovascular Guide Wire, available from Asahi Intecc Co., Ltd. However, turning to FIGS. 8A and 8B, in other embodiments the pusher need not be connected to the receiver and can instead be positionable within second tube 18 and sized to make contact with receiver 22's proximal end 70a. For example, rather than a wire, pusher 26 can comprise a coil having any of the above-described pusher lengths such that its distal end can reach receiver 22 at a distal portion of second tube 18 while its proximal end is accessible outside of first and second tubes 14 and 18, and can have an external transverse dimension smaller than the second tube's internal transverse dimension 34a but large enough to engage with the receiver's proximal end 70a. Unconnected pusher 26 can thus be advanced through second tube 18 to push and thereby deploy receiver 22 (FIG. 8A). Once receiver 22 is deployed, pusher 26 can be withdrawn from the patient (FIG. 8B) such that the full cross-section of first tube 14's lumen proximal of receiver 22 can be available for thrombus ingestion.

Referring to FIGS. 9A-9C, system 10 can comprise a multi-port adapter 102 that can facilitate advancement of second tube 18 and receiver 22 through first tube 14 and can be coupled to a vacuum source 114 for aspiration. As shown, multi-port adapter 102 can comprise at least three ports 106a-106c (FIG. 9A) to do so. First port 106a can be configured to be coupled to a proximal fitting 110 of first tube 14 (FIGS. 9B and 9C) such that a lumen of multi-port adapter 102 is in fluid communication with the first tube's lumen. Second port 106b can be configured to permit second tube 18 to pass therethrough into the lumen of multi-port adapter 102 and through the lumen of first tube 14 when the first tube's proximal fitting 110 is coupled to first port 106a (FIG. 9C). In this manner, second tube 18 and receiver 22 can be advanced to a thrombus in a patient's neurovasculature as described above. Additionally, second tube 18 can be withdrawn from first tube 14 through second port 106b during deployment of receiver 22.

For aspiration, multi-port adapter 102 can comprise a third port 106c that can be coupleable to a vacuum source 114 (FIG. 9C). Third port 106c can have a luer lock for achieving such a vacuum source connection. When vacuum source 114 is coupled to third port 106c, it can be in fluid communication with the lumen of multi-port adapter 102 and thus with the lumen of first tube 14. Vacuum source 114 can thus apply a vacuum to first tube 14 by lowering the pressure at third port 106c, thereby drawing the thrombus into receiver 22 and through the first tube. To promote efficient application of the vacuum and mitigate blood leakage out of multi-port adapter 102, second port 106b can be closed during aspiration such that fluid cannot flow therethrough. For example, second port 106b can be configured to seal around a cylindrical structure positioned therethrough (e.g., can comprise a Tuohy-Borst adapter) such that, if pusher 26 is connected to receiver 22 and remains in first tube 14 during aspiration, the second port can form a seal around the pusher after second tube 18 is withdrawn.

System 10's vacuum source 114 can comprise any suitable device by which a vacuum can be applied to first tube 14's proximal end 62a to draw a thrombus into the deployed receiver 22 and through the first tube for removal. For example, as shown vacuum source 114 can comprise a syringe that, optionally, has a barrel configured to hold greater than or equal to any one of, or between any two of, 40 mL, 50 mL, 60 mL, 70 mL, or 80 mL of fluid. The relatively small negative pressure differential that a syringe can yield between first tube 14's proximal end 64a and receiver 22's distal end 70b during aspiration can be sufficient for thrombus ingestion and removal due at least in part to the relatively large cross-sectional areas of receiver 22's mouth and throat. For example, such a pressure differential can be less than or equal to any one of, or between any two of, 180, 160, 140, 120, or 100 mm Hg.

Figure 10:
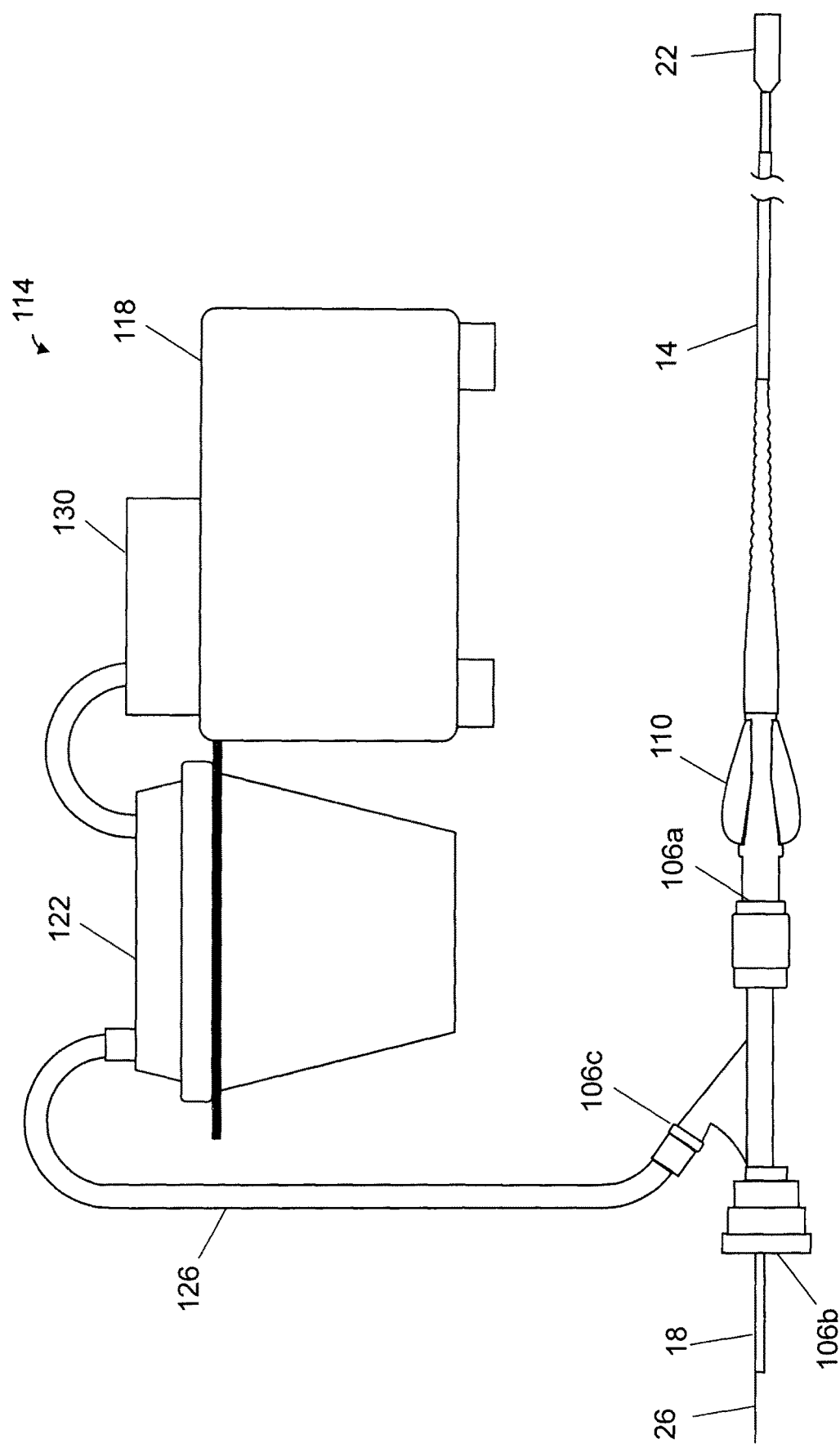
FIG. 10 depicts a system substantially similar to that shown in FIG. 9C, except that the vacuum source in FIG. 10 is a vacuum pump rather than a syringe.

Referring to FIG. 10, in other embodiments vacuum source 114 can comprise a vacuum pump, which can include a pumping unit 118 (e.g., having a motor) and a container 122 in fluid communication with the pumping unit such that the pumping unit can draw a vacuum on the container. Container 122 can in turn be coupled to multi-port adapter 102's third port 106c via a tube 126 such that pumping unit 118 is in fluid communication with and thus can apply a vacuum at first tube 14's proximal end 62a via the container, which can receive fluids drawn from a patient's vasculature during aspiration. Pumping unit 118 can be configured to control the pressure at first tube 14's proximal end 62a (e.g., with a regulator 130) to yield a sufficient pressure differential for thrombus removal.

Any of the present systems can be included in a kit. In such a kit, self-expanding receiver 22 can already be positioned at least partially within second tube 18 such that the receiver is ready for insertion into a patient, thereby allowing prompt treatment.

Figure 11B:
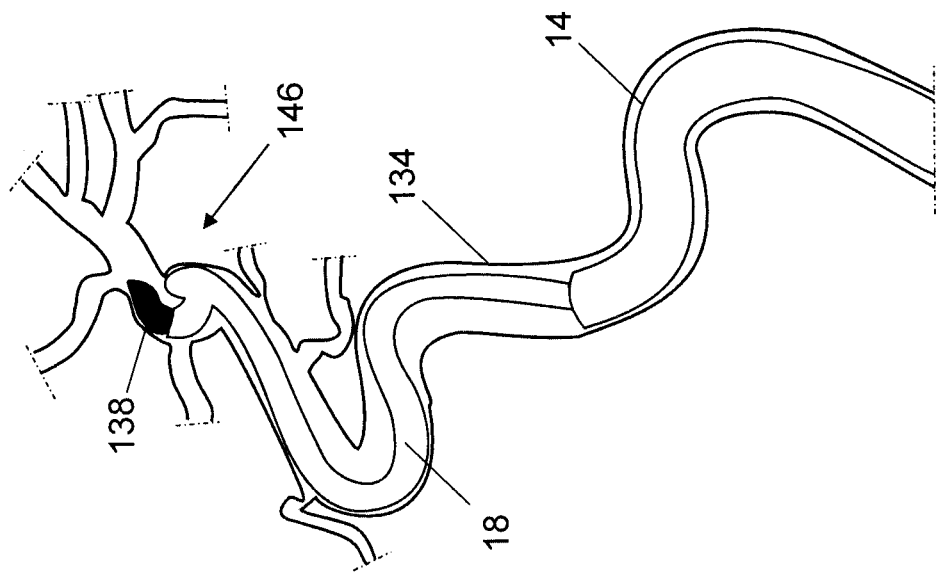
FIG. 11B depicts the vasculature of FIG. 11A, where the second tube of the FIG. 1A system is disposed within and extends beyond the first tube and to the thrombus.
Figure 11A:
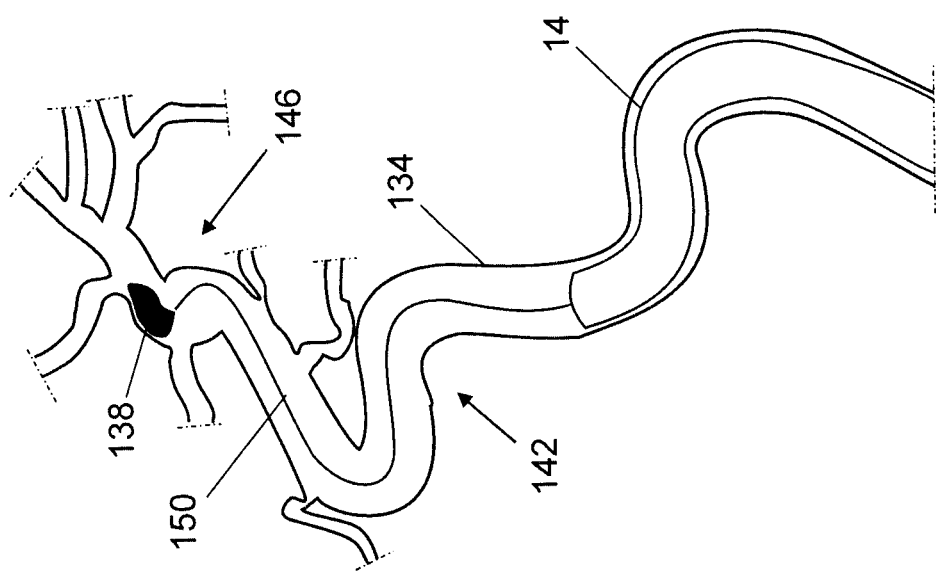
FIG. 11A depicts vasculature of a patient with a thrombus positioned in the M1 segment of the middle cerebral artery, a guidewire extending to the thrombus, and the first tube of the FIG. 1A system extending to the bottom of the internal carotid artery.

Turning to FIGS. 11A and 11B, some of the present methods of removing a thrombus (e.g., 138) (e.g., a red thrombus or a white thrombus) comprise advancing a first tube (e.g., 14) (e.g., any of those described above) through vasculature (e.g., 134) of a patient (FIG. 11A). As described above, the first tube can be inserted into the patient's vasculature at the groin and advanced up to the ICA (e.g., 142), such as within 5 cm, 4 cm, 3 cm, or 1 cm of the ICA. System 10 optionally comprises a guidewire 150, which can be advanced to the thrombus before the first tube is inserted such that the first tube can pass over the guidewire, facilitating advancement of the first tube through the patient's vasculature.

With the first tube disposed in the patient's vasculature, some methods comprise advancing a second tube (e.g., 18) (e.g., any of those described above) through the first tube (FIG. 11B). The second tube can be advanced such that a distal end (e.g., 66b) thereof is positioned distally of the first tube's distal end (e.g., 62b) in the ICA or MCA (e.g., the M1 segment thereof). In this manner, the second tube's distal end can be positioned near the thrombus, such as within 5 cm, 4 cm, 3 cm, 2 cm, or 1 cm of the thrombus. When advanced through the first tube, a proximal end (e.g., 66a) of the second tube can remain outside of the patient such that it can be accessed by a physician.

Referring to FIGS. 12A-12C, in some methods a self-expanding receiver (e.g., 22) (e.g., any of those described above) can also be advanced to the thrombus. For example, the self-expanding receiver can be positioned in a constrained orientation in the second tube (e.g., in a distal portion thereof) such that the receiver is advanced with the second tube. In such methods, the second tube can be advanced until a proximal portion (e.g., 74a) of the receiver is positioned within a distal end portion (e.g., 82) of the first tube. Alternatively, after the second tube is advanced through the first tube such that its distal end is in the ICA or MCA, the receiver can be pushed through the second tube (e.g., with pusher 26, which can comprise any of those described above) until its proximal portion is positioned in the first tube's distal portion.

To deploy the receiver, some methods comprise moving the second tube proximally relative to the receiver (FIGS. 12B and 12C), such as by pulling a proximal portion of the second tube. During at least some of the moving (e.g., while a portion of the receiver is disposed in the second tube), pressure can be applied to the receiver through the pusher, thereby facilitating unsheathing thereof. The second tube can be moved such that its distal end is positioned proximally of the receiver's distal end, thereby allowing a distal portion (e.g., 74b) of the receiver to radially expand and make contact with the blood vessel. The receiver's maximum uncompressed external transverse dimension can be larger than the vessel's internal transverse dimension (e.g., diameter) such that the expanded distal portion can exert sufficient pressure on the blood vessel to occlude blood flow therein. For example, the receiver's distal portion can exert a pressure that is greater than or equal to any one of, or between any two of, 40 kPa, 50 kPa, 60 kPa, 70 kPa, 80 kPa, 90 kPa, 100 kPa, or 110 kPa (e.g., between 50 and 100 kPa) on the vessel wall.

Movement of the second tube can be performed at least until its distal end is proximal of the receiver's proximal end. With the receiver unsheathed from the second tube, the receiver's proximal portion can radially expand and contact the first tube's distal end portion (FIG. 12C). As explained above, this permits the receiver's throat to have a larger internal transverse dimension to facilitate aspiration. If the first tube's distal end portion is radially expandable as described above, the receiver's proximal portion can cause the radially-expandable distal end portion to radially expand such that the receiver's proximal portion has an internal transverse dimension (e.g., 58c) that is at least as great as that of the first tube at a location proximal of first tube's distal end portion. When deployed, the receiver can include a transition portion (e.g., 78) that narrows between the receiver's expanded distal portion and the receiver's proximal portion disposed within the second tube.

During deployment, the position of the receiver relative to the thrombus can be adjusted with the pusher. For example, application of pressure on the receiver via the pusher can cause the receiver to advance such that the distal end thereof contacts the thrombus, which can facilitate aspiration of the thrombus. As described above, the pusher need not be connected to the receiver; with this configuration, some methods comprise withdrawing the pusher from the patient to render a greater portion of the first tube's cross-section available for aspiration.

Referring to FIGS. 12D-12F, some methods comprise applying a vacuum to the first tube (e.g., in any of the manners described above, such as with a syringe or vacuum pump). As a result, pressure at the first tube's proximal end can be reduced, yielding a negative pressure differential between the receiver's distal end and the first tube's proximal end that can cause the thrombus to aspirate into the receiver (FIG. 12D). Because the receiver's distal portion is expanded to the vessel wall, such ingestion can readily occur. Additionally, and referring to FIGS. 12E and 12F, application of the vacuum can cause the thrombus to aspirate through the receiver and into the first tube. As shown, the receiver's narrowing transition section and radially-expanded proximal portion facilitates deformation and compression of the thrombus such that the thrombus can enter the first tube. This ingestion can occur even if the thrombus is a white thrombus that is more resistant to compression than a red thrombus. The vacuum can continue to draw the ingested thrombus through the first tube and out of its proximal end. If a vacuum pump is used for aspiration, recanalization can be confirmed when a change in pump pressure occurs. In some methods, the receiver can be withdrawn into the first tube (e.g., by pulling on a proximal portion of the pusher disposed outside of the patient, if the pusher is connected to the receiver) and the first tube can be withdrawn from the patient's vasculature.

In some procedures, the thrombus may not aspirate into the first tube when the vacuum is applied, even with the relatively large receiver throat. When this occurs, to remove the thrombus the first tube and receiver can be withdrawn from the patient with the thrombus disposed in the receiver. Alternatively, the receiver can be withdrawn into the first tube (e.g., with the pusher) while the vacuum is applied to the first tube, which may allow thrombus ingestion into the first tube for removal.

EXAMPLES

The present invention will be described in greater detail by way of specific examples. The following examples are offered for illustrative purposes only and are not intended to limit the present invention in any manner. Those skilled in the art will readily recognize a variety of non-critical parameters that can be changed or modified to yield essentially the same results.

Example 1

Referring to FIGS. 13A-13D and FIGS. 14A-14C, the ingestability of a model white thrombus into a catheter during aspiration was assessed with and without a narrowing receiver (or funnel). In both experiments, the catheter through which a vacuum was drawn had a 1.5-mm diameter In the experiment employing a funnel, the funnel narrowed to a 1.0-mm diameter. As shown in FIGS. 13A-13D, without the funnel the model white thrombus was drawn to the catheter's mouth but could not pass therethrough. However, as shown in FIGS. 14A-14C, the model white thrombus could pass through the funnel and exit its throat even though the throat's 1.0-mm diameter was smaller than that of the catheter that could not ingest the thrombus. This illustrated how the tapering of the funnel facilitated thrombus ingestion.

Example 2

Figure 15A:
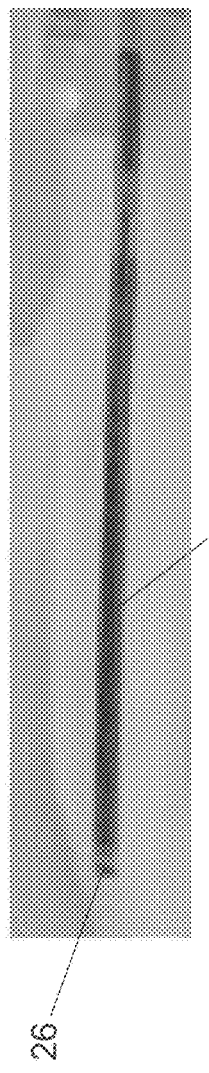
FIGS. 15A-15D depict an experiment demonstrating deployment of a self-expanding receiver from a catheter using a pusher.
Figure 15B:
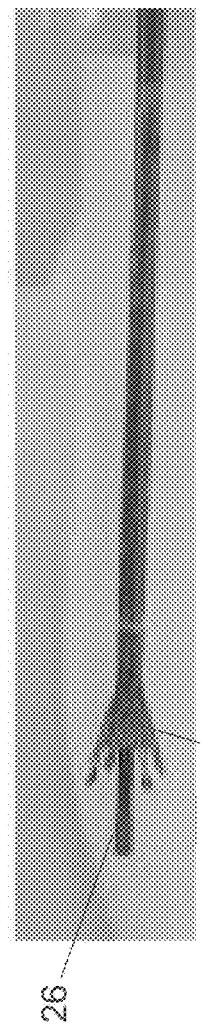
Figure 15C:
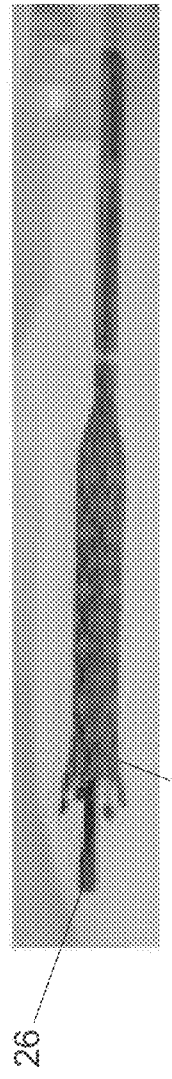
Figure 15D:
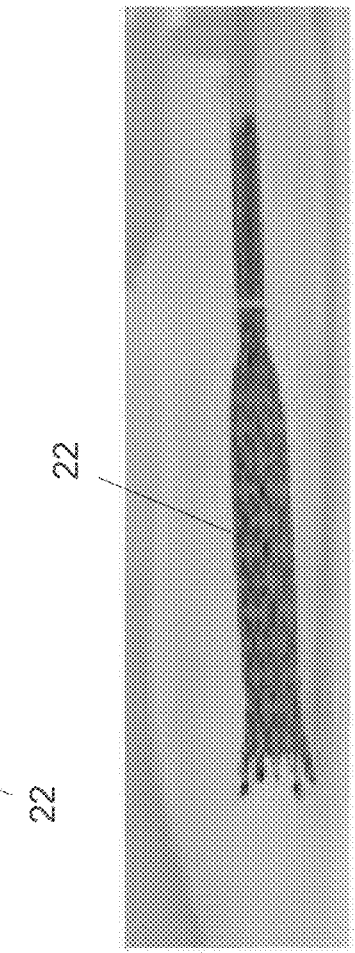

Referring to FIGS. 15A-15D, shown is an illustrative receiver (e.g., 22) that comprised struts and a membrane being deployed from a sheath with a pusher (e.g., 26). As shown, when the pusher was advanced forward, the receiver exited the sheath and expanded radially (FIGS. 15B and 15C). The pusher was then withdrawn (FIG. 15D).

Example 3

Figure 16A:
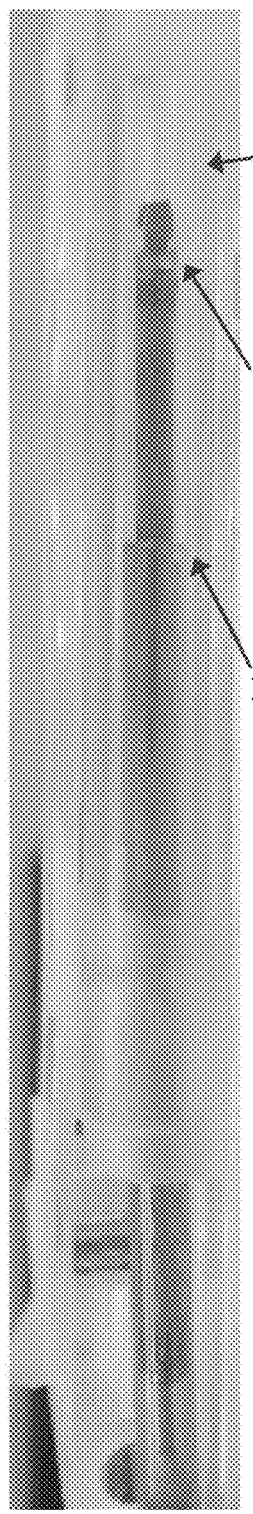
FIGS. 16A-16C depict an experiment demonstrating deployment of a self-expanding receiver from a 4 F sheath disposed within a 6 F sheath such that a proximal portion of the receiver expands to the inner wall of the 6 F sheath and a distal portion of the receiver expands to a 0.157"-diameter tube.
Figure 16B:
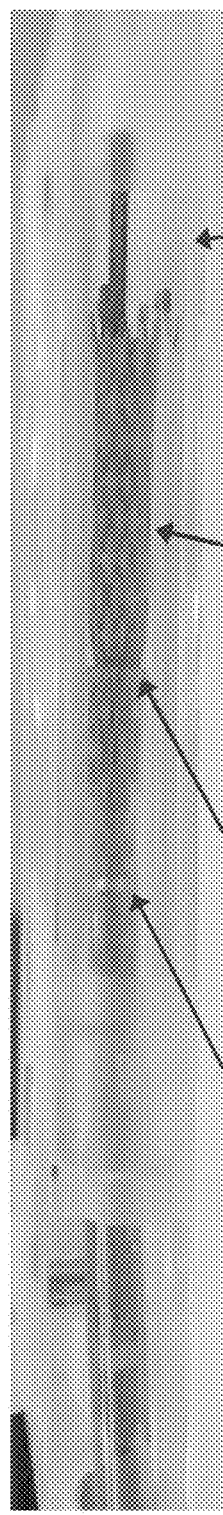
Figure 16C:
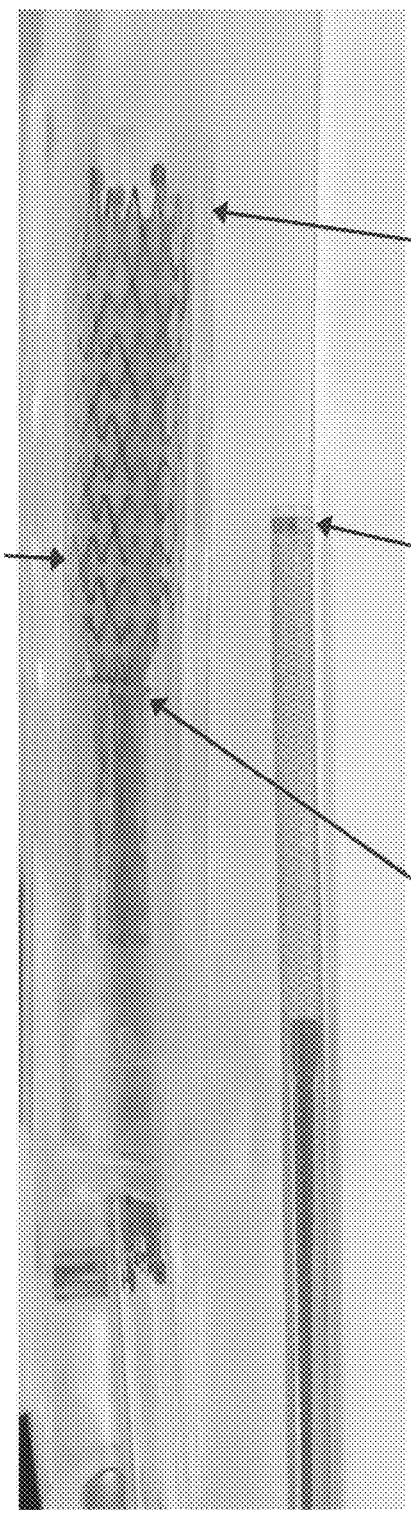

Referring to FIGS. 16A-16C, shown is an exemplary system in which the first tube (e.g., 14) was a 6 F sheath with an internal diameter of 0.090", the second tube (e.g., 18) was a 4 F sheath with an internal diameter of 0.070", and the self-expanding receiver (e.g., 22) comprised struts and a membrane. To simulate insertion into the M1 segment of the MCA, the system was inserted into a tube having an internal diameter of 0.157", with the 4 F sheath disposed in and extending past the distal end of the 6 F sheath and the receiver compressed and disposed in the 4 F sheath. The pusher (e.g., 26) was used to hold the receiver in place while the 4 F sheath was retracted (FIG. 16B). When the 4 F sheath was retracted from the 6 F sheath, the receiver expanded radially such that its distal portion engaged the inner wall of the 0.157"-diameter tube and its proximal portion engaged the inner wall of the 6 F sheath, with a narrowing transition portion therebetween (FIG. 16C).

Example 4

Figure 17B:
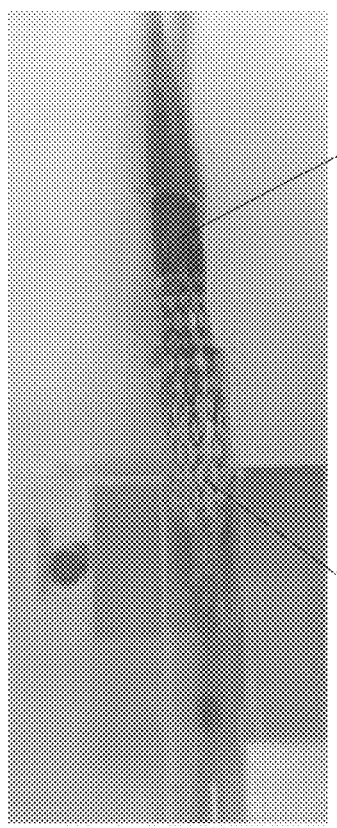
FIGS. 17A-17D depict an experiment in which a model thrombus in a 6-mm-diameter tube was aspirated through a self-expanding receiver deployed from an 8 F catheter.
Figure 17D:
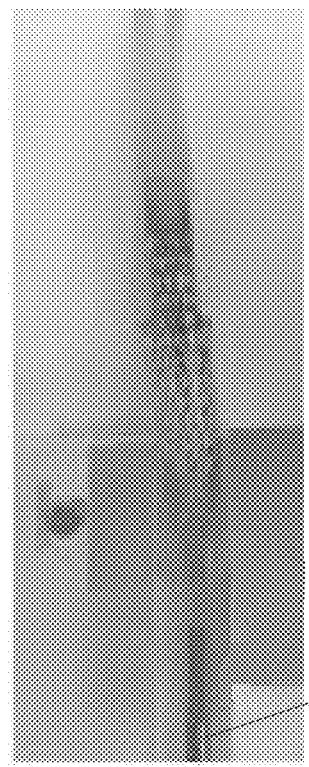
Figure 17A:
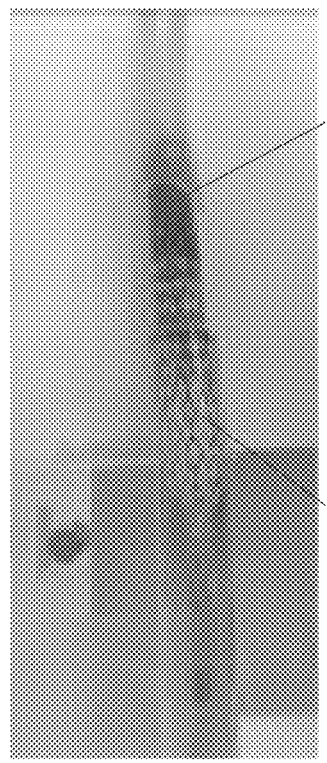
Figure 17C:
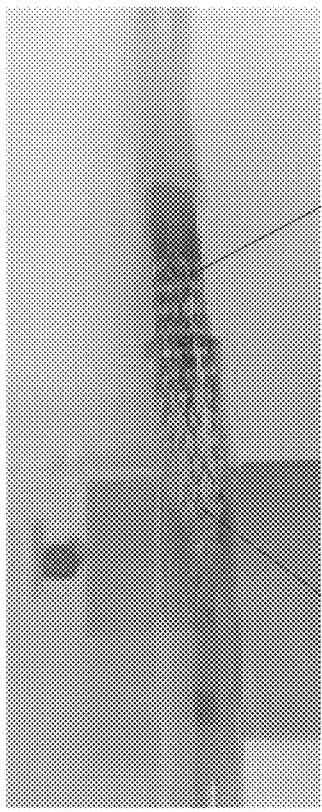

Referring to FIGS. 17A-17D, an aspiration experiment was performed with a self-expanding receiver (e.g., 22) deployed from an 8 F catheter such that the catheter's distal portion was expanded radially to the inner wall of a 6-mm-diameter tube and its proximal portion was expanded radially to the inner wall of the 8 F catheter. A model thrombus (e.g., 138) was positioned in the 6-mm-dimeter tube distally of the receiver (FIG. 17A). A vacuum was applied at the 8 F catheter's proximal end, drawing the model thrombus toward and into the receiver (FIGS. 17B and 17C). The model thrombus was able to pass through the throat of the receiver and through the 8 F catheter (FIG. 17D).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A system for use in blood clot removal, the system comprising:
   a first tube having a proximal fitting;
   a second tube slidable within the first tube;
   a self-expanding receiver having a liquid-impermeable membrane and positioned at least partially within the second tube, wherein the receiver has an open distal end configured to contact a thrombus, and wherein the receiver is radially expandable such that when the second tube and a proximal portion of the receiver are positioned within a distal end portion of the first tube and the second tube is moved proximally relative to the receiver until a distal end of the second tube is positioned proximally of a proximal end of the receiver:
      the proximal portion of the receiver radially expands and makes contact with the distal end portion of the first tube; and
      a distal portion of the receiver radially expands such that it has an inner diameter that is at least 10% larger than an inner diameter of the first tube;
   a multi-port adapter comprising:
      a first port configured to be coupled to the proximal fitting of the first tube;
      a second port configured to seal around a cylindrical structure positioned therethrough; and
      a third port having a luer lock; and
   a vacuum source couplable to the luer lock;
   wherein the system is configured such that when the multi-port adapter is coupled to the first tube, the proximal portion of the receiver radially expands, and the vacuum source is coupled to the luer lock and applies a vacuum to the first tube, an outer circumference of the proximal portion of the receiver makes uninterrupted contact over a circumferential direction with an inner circumference of the distal end portion of the first tube such that the outer circumference of the proximal portion of the receiver is surrounded entirely by the distal end portion of the first tube, and a negative pressure differential results between the receiver's distal end and a proximal end of the first tube.

2. The system of claim 1, wherein:
the distal end portion of the first tube is radially expandable; and
the proximal portion of the receiver is capable, when in contact with the radially-expandable distal end portion of the first tube, of causing the radially-expandable distal end portion of the first tube to radially expand such that the proximal portion of the self-expanding receiver comprises an inner diameter that is at least as great as an inner diameter of the first tube at a location proximal of the radially-expandable distal end portion of the first tube.

3. The system of claim 2, further comprising a pusher wire connected to the receiver.

4. The system of claim 2, further comprising a pusher positionable within the second tube and sized to make contact with the proximal end of the receiver within the second tube.

5. The system of claim 4, wherein the receiver comprises struts.

6. The system of claim 2, wherein the receiver has a radiopaque marker positioned within 1 millimeter or less of the distal end of the receiver.

7. The system of claim 6, wherein the receiver has a second radiopaque marker positioned within 1 millimeter or less of the proximal end of the receiver.

8. The system of claim 7, further comprising a guidewire positionable within a lumen of, and movable relative to, the second tube.

9. A system for use in blood clot removal, the system comprising:
a first tube having a proximal fitting;
a second tube slidable within the first tube;
a self-expanding receiver having a liquid-impermeable membrane and positioned at least partially within the second tube, wherein the receiver has an open distal end configured to contact a thrombus, and wherein the receiver is radially expandable such that when the second tube and a proximal portion of the receiver are positioned within a distal end portion of the first tube and the second tube is moved proximally relative to the receiver until a distal end of the second tube is positioned proximally of a proximal end of the receiver:
the proximal portion of the receiver radially expands and makes contact with the distal end portion of the first tube; and
a multi-port adapter comprising:
a first port configured to be coupled to the proximal fitting of the first tube;
a second port configured to seal around a cylindrical structure positioned therethrough; and
a third port having a luer lock; and
a vacuum source couplable to the luer lock;
wherein the system is configured such that when the multi-port adapter is coupled to the first tube, the proximal portion of the receiver radially expands, and the vacuum source is coupled to the luer lock and applies a vacuum to the first tube, an outer circumference of the proximal portion of the receiver makes uninterrupted contact over a circumferential direction with an inner circumference of the distal end portion of the first tube such that the outer circumference of the proximal portion of the receiver is surrounded entirely by the distal end portion of the first tube, and a negative pressure differential results between the receiver's distal end and a proximal end of the first tube.

10. The system of claim 9, wherein:
the distal end portion of the first tube is radially expandable; and
the proximal portion of the receiver is capable, when in contact with the radially-expandable distal end portion of the first tube, of causing the radially-expandable distal end portion of the first tube to radially expand such that the proximal portion of the self-expanding receiver comprises an inner diameter that is at least as great as an inner diameter of the first tube at a location proximal of the radially-expandable distal end portion of the first tube.

11. The system of claim 10, further comprising a pusher wire connected to the receiver.

12. The system of claim 10, further comprising a pusher positionable within the second tube and sized to make contact with the proximal end of the receiver within the second tube.

13. The system of claim 12, wherein the receiver comprises struts.

14. The system of claim 10, wherein the receiver has a radiopaque marker positioned within 1 millimeter or less of the distal end of the receiver.

15. The system of claim 14, wherein the receiver has a second radiopaque marker positioned within 1 millimeter or less of the proximal end of the receiver.

16. The system of claim 15, further comprising a guidewire positionable within a lumen of, and movable relative to, the second tube.

17. A system for use in blood clot removal, the system comprising:
a first tube having a proximal fitting;
a second tube slidable within the first tube;
a self-expanding receiver having a liquid-impermeable membrane and positioned at least partially within the second tube, wherein the receiver has an open distal end configured to contact a thrombus, and wherein the receiver is radially expandable such that when the second tube and a proximal portion of the receiver are positioned within a distal end portion of the first tube and the second tube is moved proximally relative to the receiver until a distal end of the second tube is positioned proximally of a proximal end of the receiver:
the proximal portion of the receiver radially expands and makes contact with the distal end portion of the first tube;
a multi-port adapter comprising:
a first port configured to be coupled to the proximal fitting of the first tube;
a second port configured to seal around a cylindrical structure positioned therethrough; and
a third port having a luer lock; and
a vacuum source couplable to the luer lock;
wherein the system is configured such that when the proximal portion of the receiver radially expands, and the vacuum source is coupled to the luer lock and applies a vacuum to the first tube, an outer circumference of the proximal portion of the receiver makes uninterrupted contact over a circumferential direction with an inner circumference of the distal end portion of the first tube such that the outer circumference of the proximal portion of the receiver is surrounded entirely by the distal end portion of the first tube, and a negative pressure differential results between the receiver's distal end and a proximal end of the first tube.

18. The system of claim 17, wherein:
the distal end portion of the first tube is radially expandable; and the proximal portion of the receiver is capable, when in contact with the radially-expandable distal end portion of the first tube, of causing the radially-expandable distal end portion of the first tube to radially expand such that the proximal portion of the self-expanding receiver comprises an inner diameter that is at least as great as an inner diameter of the first tube at a location proximal of the radially-expandable distal end portion of the first tube.

19. The system of claim 18, further comprising a pusher wire connected to the receiver.

20. The system of claim 18, further comprising a pusher positionable within the second tube and sized to make contact with the proximal end of the receiver within the second tube.

* * * * *